US009316805B2

(12) United States Patent
Howe

(10) Patent No.: US 9,316,805 B2
(45) Date of Patent: Apr. 19, 2016

(54) FRAMELESS LIGHT MODIFYING ELEMENT

(71) Applicant: Leslie David Howe, Atlanta, GA (US)

(72) Inventor: Leslie David Howe, Atlanta, GA (US)

(73) Assignee: SOUTHPAC TRUST INTERNATIONAL INC, TRUSTEE OF THE LDH TRUST, Rarotonga (CK)

( * ) Notice: Subject to any disclaimer, the term of this patent is extended or adjusted under 35 U.S.C. 154(b) by 0 days.

(21) Appl. No.: 14/534,431

(22) Filed: Nov. 6, 2014

(65) Prior Publication Data

US 2015/0062913 A1 Mar. 5, 2015

Related U.S. Application Data

(63) Continuation-in-part of application No. 14/225,546, filed on Mar. 26, 2014, now Pat. No. 8,905,594, which is a continuation of application No. PCT/US2013/039895, filed on May 7, 2013, and a (Continued)

(51) Int. Cl.
*F21V 5/02* (2006.01)
*G02B 7/00* (2006.01)
*F21V 5/00* (2015.01)

(52) U.S. Cl.
CPC ............... *G02B 7/006* (2013.01); *F21V 5/002* (2013.01)

(58) Field of Classification Search
CPC ........... F21V 17/10; F21V 5/04; F21V 5/002; F21V 3/00; F21V 5/00; F21V 17/16; F21V 29/22; F21V 5/043; F21V 13/02; F21S 8/06; G02B 7/006; G02F 1/133608; F21K 9/50; F21K 9/10; F21Y 2103/003; F21Y 2101/02
See application file for complete search history.

(56) References Cited

U.S. PATENT DOCUMENTS 2,534,776 A * 12/1950 Kershaw et al. ............... 359/418
2,800,574 A * 7/1957 Kilpatrick et al. ............. 362/224
3,600,569 A 8/1971 Matteson
(Continued)

FOREIGN PATENT DOCUMENTS

JP       5719751 A  *  5/1981
JP       04218202    *  8/1992
JP     2001216827    *  8/2001

OTHER PUBLICATIONS

International Search Report and Written Opinion PCT/US2013/039895 Aug. 27, 2013.

*Primary Examiner* — Bao Q Truong
*Assistant Examiner* — Fatima Farokhrooz
(74) *Attorney, Agent, or Firm* — Troutman Sanders LLP; James E. Schutz; Mark Lehi Jones

(57) ABSTRACT

A lens apparatus is disclosed that can include at least one piece of optical film comprising two or more major edges, a front light-emitting side, a back light-receiving side and four corner regions, each having one or more associated minor edges defining one or more corner cuts that define a corner cutout. The lens apparatus may also include an edge truss configured on the two or more major edges, wherein each edge truss may be disposed towards the back light-receiving side of the at least one piece of optical film. Each edge truss may include one or more sides configured from a corresponding fold in the at least one piece of optical film, wherein at least one of the one or more sides of each edge truss may be configured to impart support to the lens apparatus and to resist deflection of each edge truss.

26 Claims, 24 Drawing Sheets

Related U.S. Application Data continuation-in-part of application No. 13/531,515, filed on Jul. 23, 2012, which is a continuation-in-part of application No. 12/952,765, filed on Nov. 23, 2010, now Pat. No. 8,568,002, application No. 14/534,431, which is a continuation-in-part of application No. 14/490,188, filed on Sep. 18, 2014, now Pat. No. 9,039,251, application No. 14/534,431, which is a continuation-in-part of application No. 14/254,960, filed on Apr. 17, 2014, now Pat. No. 8,876,337, and a continuation-in-part of application No. 14/231,819, filed on Apr. 1, 2014, and a continuation-in-part of application No. 14/267,940, filed on May 2, 2014, now Pat. No. 8,950,905.

(60) Provisional application No. 61/741,669, filed on Jul. 26, 2012, provisional application No. 61/742,251, filed on Aug. 6, 2012, provisional application No. 61/795,420, filed on Oct. 17, 2012, provisional application No. 61/848,526, filed on Jan. 7, 2013, provisional application No. 61/958,559, filed on Jul. 30, 2013, provisional application No. 61/963,037, filed on Nov. 19, 2013, provisional application No. 61/963,603, filed on Dec. 9, 2013, provisional application No. 61/963,725, filed on Dec. 13, 2013, provisional application No. 61/964,060, filed on Dec. 23, 2013, provisional application No. 61/964,422, filed on Jan. 6, 2014, provisional application No. 61/965,710, filed on Feb. 6, 2014, provisional application No. 62/122,158, filed on Oct. 14, 2014.

(56) References Cited

U.S. PATENT DOCUMENTS

| | | | | |
|---|---|---|---|---|
| 3,883,732 A * | 5/1975 | Peterson et al. | | 362/294 |
| 4,277,820 A * | 7/1981 | Bostonian | | 362/223 |
| 4,474,432 A * | 10/1984 | Takamatsu et al. | | 349/150 |
| 4,814,954 A * | 3/1989 | Spitz | | 362/217.07 |
| 5,515,254 A * | 5/1996 | Smith et al. | | 362/293 |
| 5,908,234 A * | 6/1999 | Kreeft | | F21V 17/164 362/223 |
| 6,195,196 B1 * | 2/2001 | Kimura et al. | | 359/295 |
| 6,467,209 B1 | 10/2002 | Vickers | | |
| 6,837,593 B1 * | 1/2005 | Schutz et al. | | 362/218 |
| 7,396,150 B2 | 7/2008 | Ogawa | | |
| 7,719,628 B2 | 5/2010 | Suh | | |
| 8,021,029 B2 | 9/2011 | Best | | |
| 8,284,346 B2 | 10/2012 | Park et al. | | |
| 8,506,104 B1 | 8/2013 | Murphy | | |
| 8,596,809 B2 * | 12/2013 | Johnston | | G02B 5/0242 362/606 |
| 8,662,693 B2 | 3/2014 | Huang | | |
| 8,858,032 B2 | 10/2014 | Van De Ven et al. | | |
| 2003/0179574 A1 * | 9/2003 | Kuisma | | 362/217 |
| 2005/0265019 A1 * | 12/2005 | Sommers et al. | | 362/217 |
| 2005/0281023 A1 * | 12/2005 | Gould et al. | | 362/217 |
| 2006/0221641 A1 * | 10/2006 | Yoon et al. | | 362/623 |
| 2007/0047261 A1 * | 3/2007 | Thompson et al. | | 362/623 |
| 2007/0126004 A1 * | 6/2007 | Cok | | 257/59 |
| 2007/0154681 A1 * | 7/2007 | Lee | | 428/126 |
| 2007/0183148 A1 | 8/2007 | Mayfield, III et al. | | |
| 2008/0019126 A1 * | 1/2008 | Straton et al. | | 362/218 |
| 2008/0079906 A1 * | 4/2008 | Finn | | 353/53 |
| 2008/0117627 A1 * | 5/2008 | Lu | | F21S 4/003 362/231 |
| 2008/0266851 A1 * | 10/2008 | Engel | | 362/240 |
| 2009/0219713 A1 | 9/2009 | Siemiet et al. | | |
| 2009/0245766 A1 * | 10/2009 | Sasaki | | 396/25 |
| 2010/0058703 A1 * | 3/2010 | Werner et al. | | 52/645 |
| 2011/0290038 A1 * | 12/2011 | Hoshino et al. | | 73/862.627 |
| 2012/0087122 A1 * | 4/2012 | Takeuchi et al. | | 362/235 |
| 2012/0113628 A1 | 5/2012 | Burrow | | |
| 2012/0236560 A1 * | 9/2012 | Bosch et al. | | 362/240 |
| 2012/0268837 A1 * | 10/2012 | Rittenburg | | G02B 3/08 359/742 |
| 2012/0268838 A1 * | 10/2012 | Rittenburg | | B43K 29/003 359/802 |
| 2013/0088869 A1 * | 4/2013 | Yun et al. | | 362/249.01 |
| 2013/0148340 A1 * | 6/2013 | Shen | | 362/184 |

\* cited by examiner

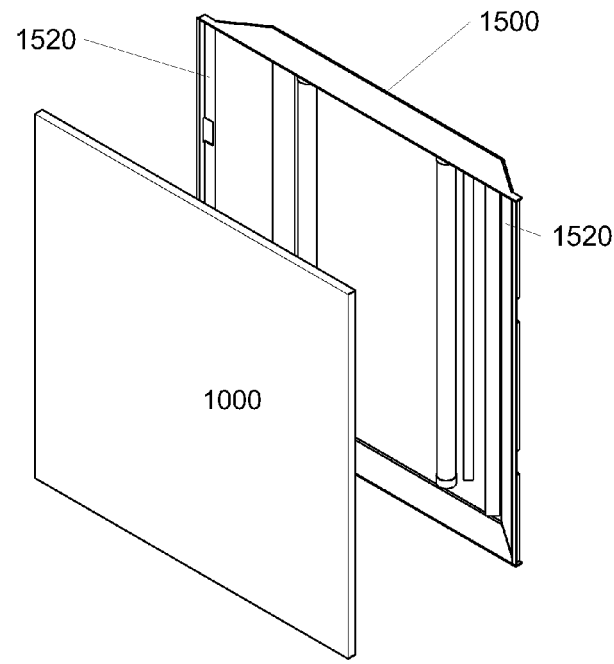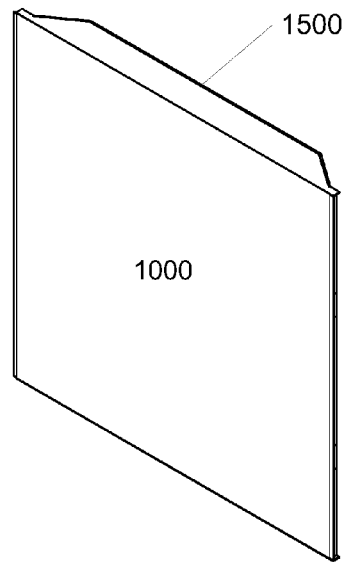
FIG 8A
FIG 8B
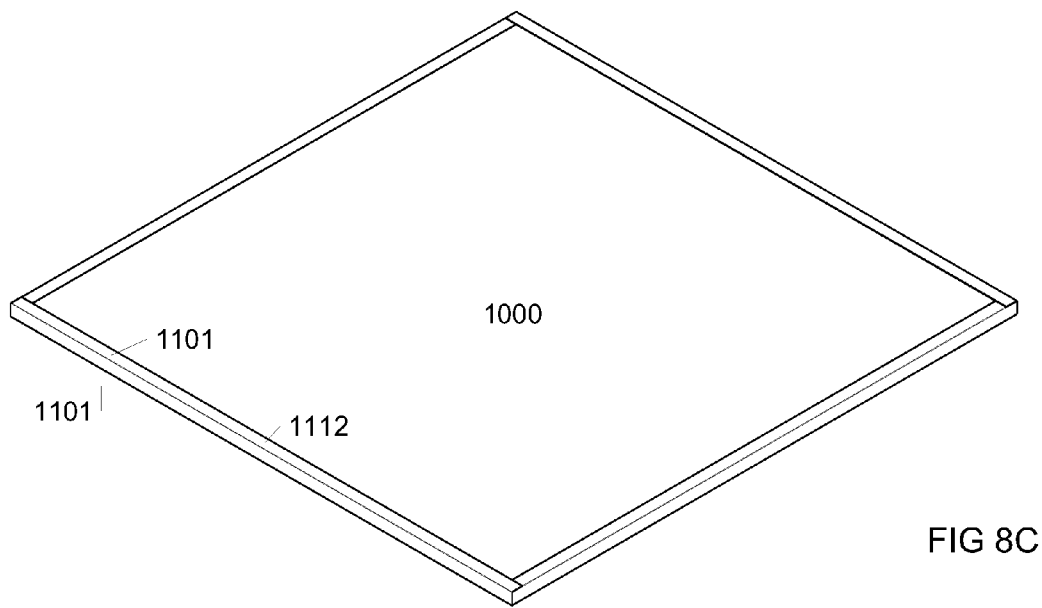
FIG 8C

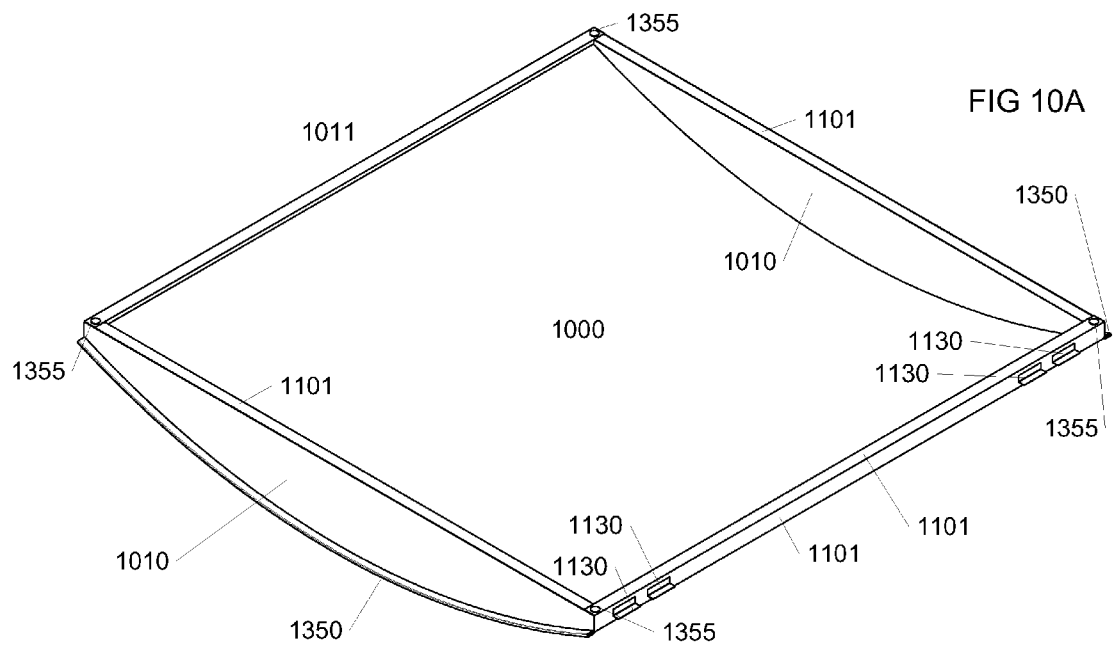
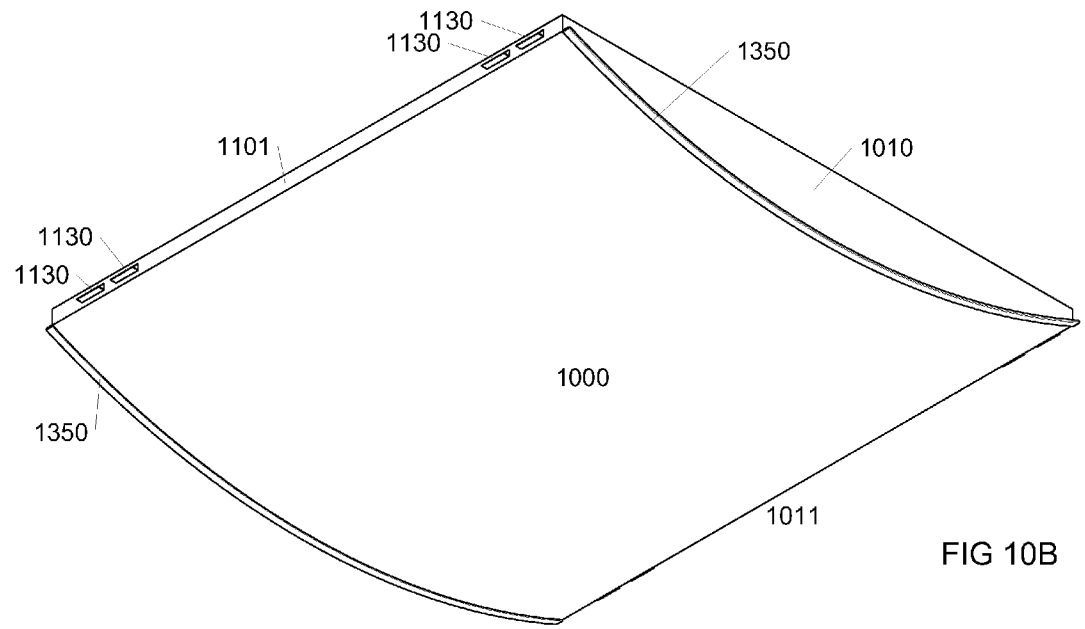

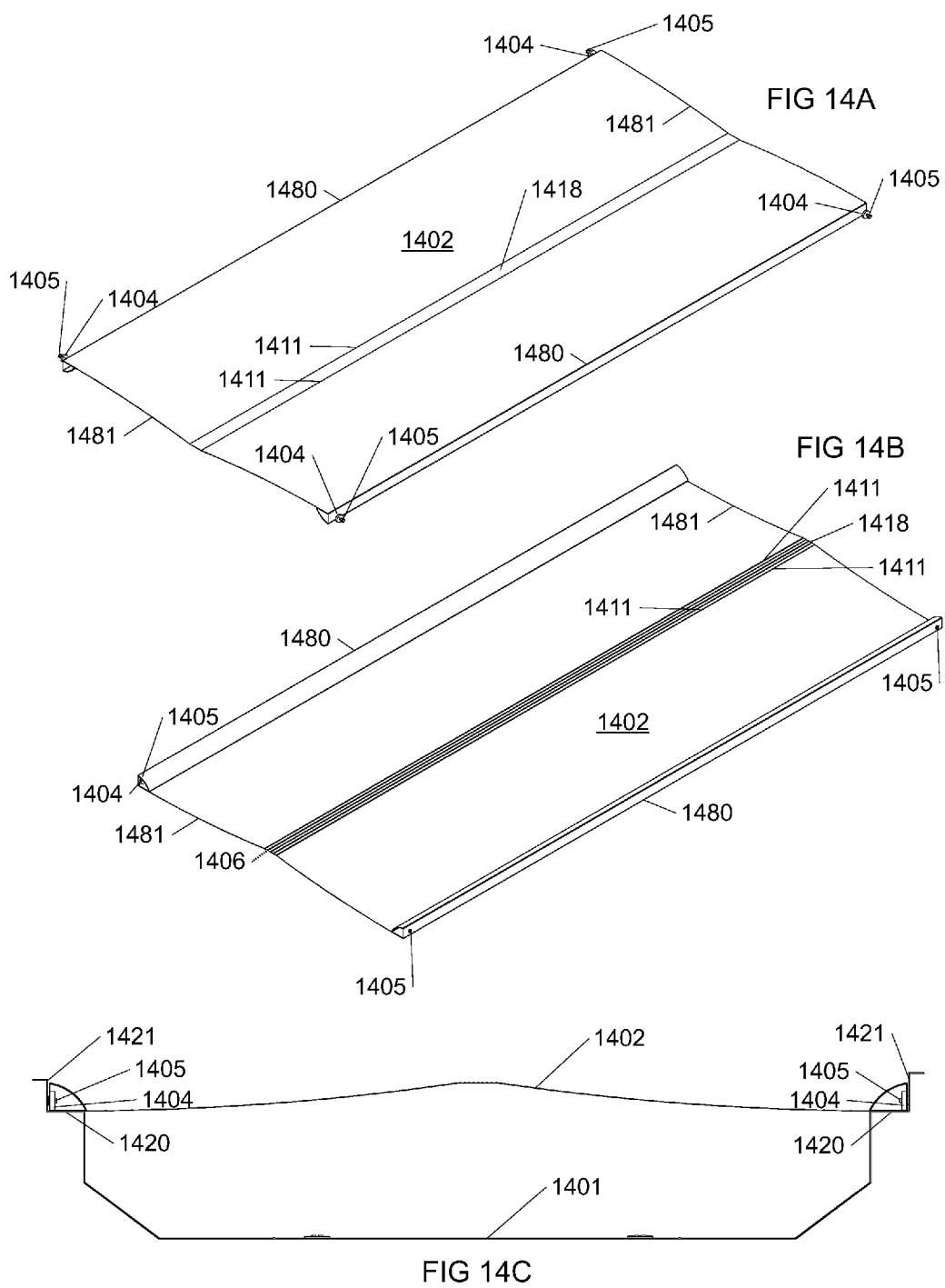

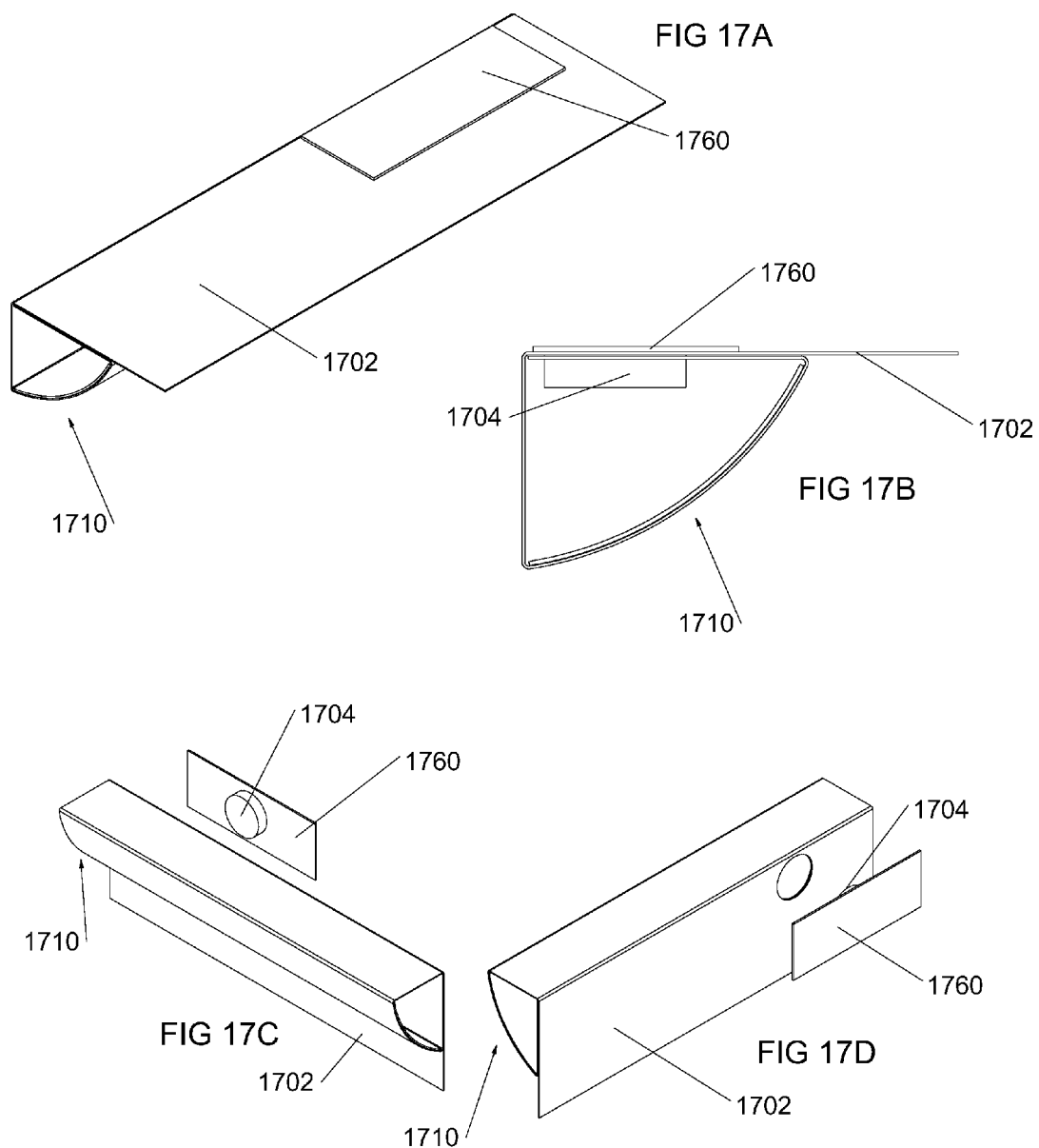

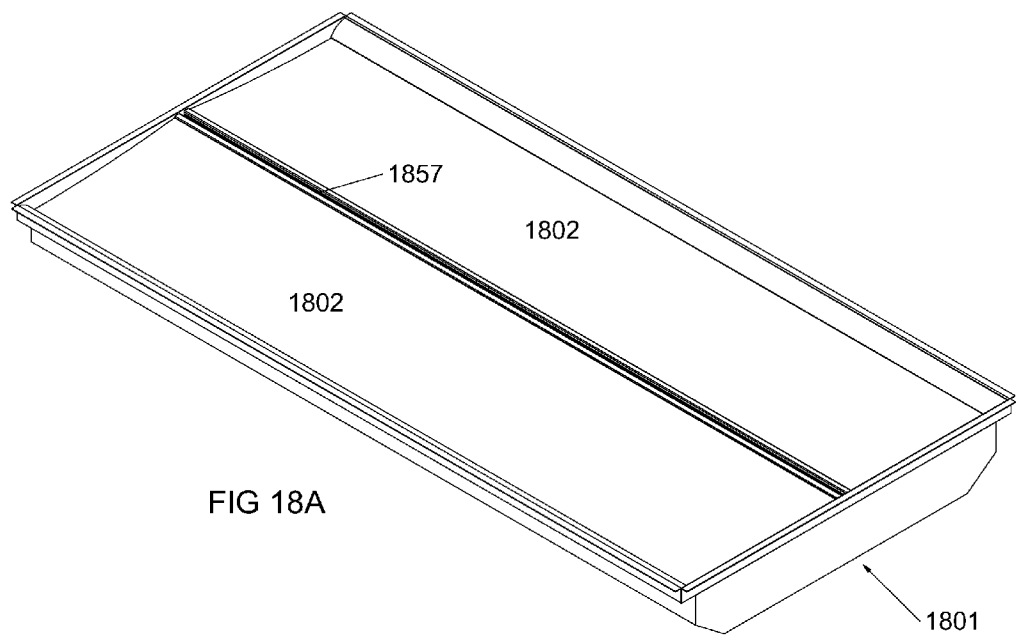
FIG 18A
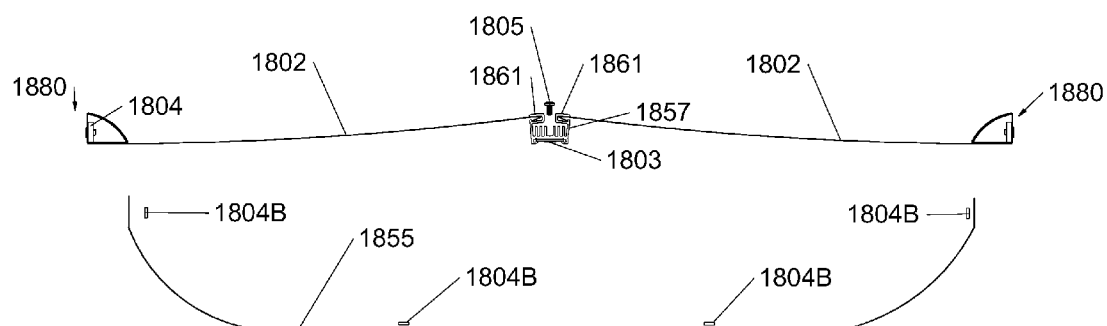
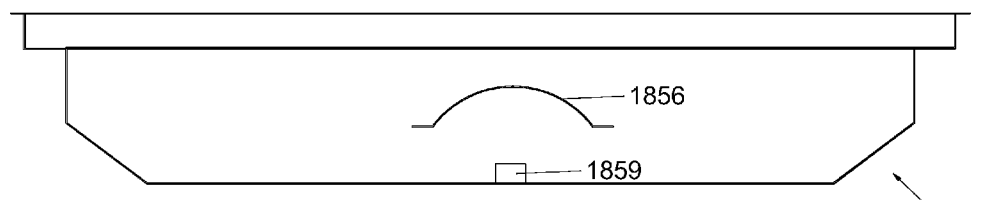
FIG 18B

FRAMELESS LIGHT MODIFYING ELEMENT

RELATED APPLICATIONS

This application is a continuation in part of U.S. patent application Ser. No. 14/225,546, entitled "Frameless Light Modifying Element," filed Mar. 26, 2014, the contents of which are incorporated herein by reference in their entirety, as if set forth in full.

U.S. patent application Ser. No. 14/225,546 is a continuation under 35 U.S.C. 365 of PCT Application No. PCT/US2013/039895, entitled "Frameless Light Modifying Element," filed May 7, 2013, the contents of which are incorporated herein by reference in their entirety, as if set forth in full. PCT Application No. PCT/US2013/039895 claims the benefit of the following United States Provisional Patent Applications, the contents of which are incorporated herein by reference in their entirety, as if set forth in full: U.S. Provisional Patent Application No. 61/741,669, entitled "Frameless Optical Film Lens," filed Jul. 26, 2012; U.S. Provisional Patent Application No. 61/742,251, entitled "Frameless Optical Film Lens," filed Aug. 6, 2012; U.S. Provisional Patent Application No. 61/795,420, entitled "Frameless Optical Film Lens," filed Oct. 17, 2012; and U.S. Provisional Patent Application No. 61/848,526, entitled "Frameless Optical Film Lens" filed Jan. 7, 2013.

This application is also a continuation-in-part of U.S. patent application Ser. No. 13/531,515, now Publication No. US20120300471, entitled "Light Diffusion and Condensing Fixture," filed Jul. 23, 2012. U.S. patent application Ser. No. 13/531,515 is a continuation-in-part of U.S. patent application Ser. No. 12/952,765, now U.S. Pat. No. 8,568,002, entitled "Light Diffusion and Condensing Fixture," filed Nov. 23, 2010 and issued Oct. 29, 2013, the contents of which are incorporated by reference in their entirety as if set forth in full.

This application is also a continuation-in-part of U.S. patent application Ser. No. 14/490,188 entitled "Light Fixtures and Multi-Plane Light Modifying Elements," filed Sep. 18, 2014. U.S. patent application Ser. No. 14/490,188 claims priority to U.S. Provisional Patent Application No. 61/958,559, entitled "Hollow Truncated-Pyramid Shaped Light Modifying Element," filed Jul. 30, 2013, the contents of which are incorporated by reference in their entirety as if set forth in full.

This application is also a continuation-in-part of U.S. patent application Ser. No. 14/254,960, corresponding to U.S. Patent Application Publication US20140233231, entitled "Light Fixtures and Multi-Plane Light Modifying Elements," filed Apr. 17, 2014 and issued as U.S. Pat. No. 8,876,337 on Nov. 4, 2014, the contents of which are incorporated by reference in their entirety as if set forth in full.

This application is also a continuation-in-part of U.S. patent application Ser. No. 14/231,819, corresponding to U.S. Patent Application Publication US20140211484, entitled "Light Modifying Elements," filed Apr. 1, 2014, the contents of which are incorporated by reference in their entirety as if set forth in full.

This application is also a continuation-in-part of U.S. patent application Ser. No. 14/267,940, corresponding to U.S. Patent Application Publication US20140240980, entitled "Optical Film Compression Lenses, Overlays and Assemblies," filed May 2, 2014, the contents of which are incorporated by reference in their entirety as if set forth in full.

This application also claims the benefit of the following United States Provisional Patent Applications, the contents of which are incorporated by reference in their entirety as if set forth in full: U.S. Provisional Patent Application No. 61/963,037, entitled "Light Fixtures and Multi-Plane Light Modifying Elements," filed Nov. 19, 2013; U.S. Provisional Patent Application No. 61/963,603, entitled "LED Module," filed Dec. 9, 2013; U.S. Provisional Patent Application No. 61/963,725, entitled "LED Module and Inner Lens System," filed Dec. 13, 2013; U.S. Provisional Patent Application No. 61/964,060, entitled "LED Luminaire, LED Mounting Method, and Lens Overlay," filed Dec. 23, 2013; U.S. Provisional Patent Application No. 61/964,422, entitled "LED Light Emitting Device, Lens, and Lens-Partitioning Device," filed Jan. 6, 2014; U.S. Provisional Patent Application No. 61/965,710, entitled "Compression Lenses, Compression Reflectors and LED Luminaires Incorporating the Same," filed Feb. 6, 2014; and U.S. Provisional Patent Application No. 62/122,158, entitled "Frameless Light Modifying Element" filed on Oct. 14, 2014, the contents of which are incorporated by reference in their entirety as if set forth in full.

TECHNICAL FIELD

This invention generally relates to lighting, light fixtures and lenses.

BACKGROUND

Lighting fixtures, whether designed for commercial or residential applications may typically utilize lens systems to control the fixture's light distribution pattern, light intensity and diffusion. There is a continuing long felt need for lens systems that can provide the required control of a light fixture's output, but do so with improved efficiency and lower manufacturing costs. These needs may be addressed by some or all of the embodiments described herein.

BRIEF DESCRIPTION OF THE FIGURES

FIG. 8A depicts an exploded perspective view of a recessed troffer lighting fixture with an example embodiment of frameless optical film lens.

FIG. 8B depicts a perspective view of a recessed troffer lighting fixture with an example embodiment of a mounted frameless optical lens.

FIG. 8C depicts a perspective view of the back side of the example embodiment of the frameless optical lens 1000 as depicted in FIG. 8A.

FIG. 10A shows a perspective view of the back side of an example embodiment of an assembly including a curved frameless optical lens center section.

FIG. 10B shows a perspective view of the top side of the example embodiment of an assembly including a curved frameless optical film center section depicted in FIG. 10A.

FIG. 14A shows an exploded perspective view of the back light-receiving side of the example embodiment of suspended optical film lens assembly shown in FIG. 13A.

FIG. 14B shows a perspective view of the front light-emitting side of the example embodiment of suspended optical film lens assembly shown in FIG. 13A.

FIG. 14C shows a side cutaway view of the troffer light fixture with an example embodiment of suspended optical film lens assembly attached thereto as shown in FIG. 13A.

FIG. 17A shows a perspective cutaway view of a corner section of an example embodiment of a suspended optical film lens assembly utilizing magnets mounted on adhesive tape strips.

FIG. 17B shows a side cutaway view of a corner section of an example embodiment of a suspended optical film lens assembly utilizing magnets mounted on adhesive tape strips.

FIG. 17C shows a perspective exploded cutaway view of a corner section of an example embodiment of a suspended optical film lens assembly utilizing magnets mounted on adhesive tape strips.

FIG. 17D shows an alternate perspective exploded cutaway view of a corner section of an example embodiment of a suspended optical film lens assembly utilizing magnets mounted on adhesive tape strips.

FIG. 18A shows a perspective view of a troffer light fixture with an example embodiment of lens assembly with integral LED light engine attached.

FIG. 18B shows an exploded side cut-away view of the troffer light fixture with an example embodiment of light reflector and lens assembly with integral LED light engine attached as shown in FIG. 18A, and includes an example embodiment of light reflector.

SUMMARY

Figure 1:
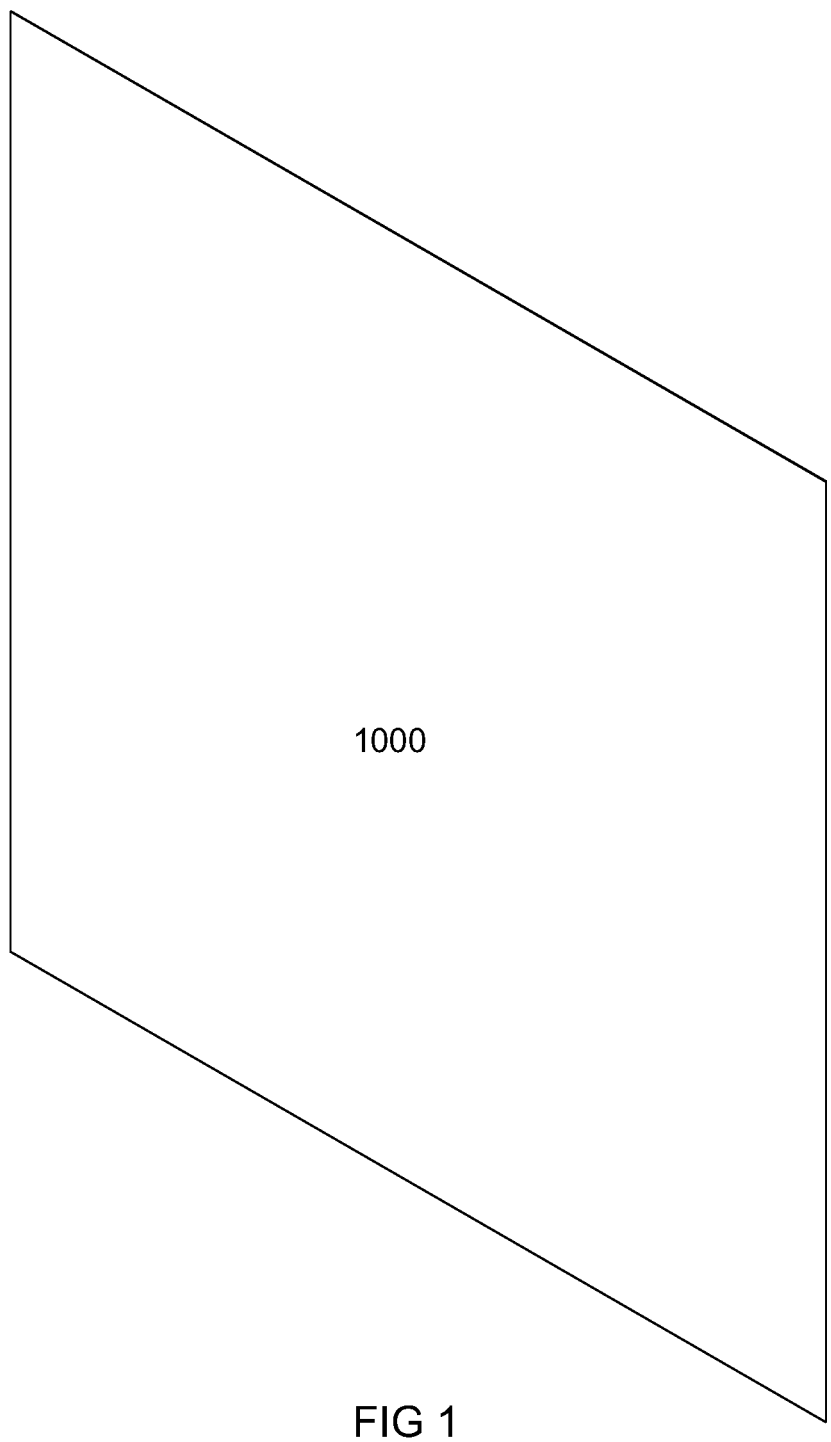
FIG. 1 depicts a perspective view of a sheet of optical film.

According to various implementations of the disclosed technology, a light modifying element is provided. In one example implementation, the light modifying element includes one or more optical film pieces characterized by one or more edge trusses disposed at two or more opposing edges of at least one of the one or more optical film pieces. The one or more edge trusses are characterized by one or more folds of at least a portion of at least one of the one or more optical film pieces. The one or more edge trusses disposed at two or more opposing edges are further configured to support the one or more optical film pieces in a substantially planar configuration.

An example embodiment of the disclosed technology includes a lens comprising: one or more pieces of optical film configured for attaching to and modifying light from a light emitting device. The one or more pieces of optical film define: a lens aperture having a lens aperture plane defined by two or more edges of at least a portion of the optical film; a front light-emitting side of the lens; a back light-receiving side of the lens; and two or more edge trusses configured from and corresponding to the two or more edges defining the lens aperture plane, wherein the two or more edge trusses are disposed towards the back light-receiving side of the lens. Each of the two or more edge trusses include one or more sides configured from a corresponding fold in the one or more optical films, wherein at least one of the one or more sides of each of the two or more edge trusses is configured at an angle relative to the lens aperture plane to impart support to the lens and to resist deflection of each edge truss.

An example embodiment of the disclosed technology includes a light-modifying element for modifying light from a light emitting device. The light-modifying element includes: at least one piece of optical film, the at least one piece of optical film comprising: four edges; a light-emitting front side; and a light-receiving back side; and at least one fold on each of the four edges, wherein each fold defines an edge section at an angle relative to the light-emitting front side, and wherein each of the four edges are disposed towards the light-receiving back side, and wherein each edge section imparts structural support to the light modifying element such that the light modifying element will be disposed in a substantially flat configuration when suspended from four or more points along two or more edge sections, or when suspended along all or a portion of a periphery of the front side of the at least one optical film piece.

An example embodiment of the disclosed technology includes a light fixture. The light fixture includes an enclosure having an aperture; a light source disposed inside the enclosure; and a lens covering all or a portion of the aperture, the lens configured for modifying light from the light source and comprising at least one piece of optical film, the at least one piece of optical film comprising: four edges; a light-emitting front side; a light-receiving back side; and at least one fold configured along each of the four edges, wherein each fold creates an edge section at an angle relative to the light-emitting front side, and wherein each edge section is disposed towards the light-receiving back, and wherein each edge section imparts structural support to the light modifying element such that the light modifying element will be disposed in a substantially flat configuration when suspended from four or more points along two or more edge sections, or when suspended along all or a portion of a periphery of the light-emitting front side.

An example embodiment of the disclosed technology includes a light fixture. The light fixture includes an enclosure with an aperture; a light source disposed inside the enclosure; and one or more lenses covering all or a portion of the aperture, the one or more lenses configured for modifying light from the light source, and comprising at least one piece of optical film with a thickness of under 325 um, wherein the at least one piece of optical film is disposed in a substantially planar configuration without mechanical tensioners or a supporting substrate.

According to another example implementation of the disclosed technology, a light modifying element is provided. In an example implementation, the light modifying element includes one or more optical film pieces characterized by a substantially curved optical film center section and two side sections. In an example implementation, each of the two side sections include at least one curved edge, wherein two opposing edges of the optical film center section are configured for fastening to the at least one curved edge of each of the side sections. In an example implementation, the optical film center section is characterized by one or more edge trusses disposed at two opposing edges of at least one of the one or more optical film pieces. The one or more edge trusses are characterized by one or more folds of at least a portion of at least one of the one or more optical film pieces, and the one or more edge trusses are further configured to support the light modifying element in a substantially planar configuration in at least one direction.

In an example embodiment of the disclosed technology, a lens apparatus may comprise at least one piece of optical film configured for modifying light. The at least one piece of optical film may comprise a front light-emitting side, a back light-receiving side, two or more major edges and four corner regions. One or more of a score line, perforated line and crimp line may be configured into the at least one piece of optical film adjacent to at least a portion of at least the two or more major edges. Edge trusses may be configured along all or a substantial portion of the at least two major edges of the at least one piece of optical film, wherein each edge truss comprises one or more edge truss sides configured from folds in the at least one piece of optical film along the one or more of score lines, perforated lines and crimp lines. At least one edge truss side of each edge truss may be configured at an angle relative to the front light-emitting side of the at least one piece of optical film. Each edge truss may be configured to impart support to the lens apparatus and to resist deflection of the lens apparatus to enable the lens apparatus to be disposed in a substantially flat configuration without tensioners or tensioning from an external frame when suspended along all, or a portion of the periphery of the front light-emitting side of the optical film piece, or suspended from four or more points on two or more edge trusses.

In an example embodiment of the disclosed technology, a lens apparatus may comprise at least one piece of optical film configured for modifying light. The at least one piece of optical film may comprise two or more major edges, a front light-emitting side, a back light-receiving side and four corner regions, each having one or more associated minor edges defining one or more corner cuts that define a corner cutout. The lens apparatus may also comprise an edge truss configured on the two or more major edges, wherein each edge truss may be disposed towards the back light-receiving side of the at least one piece of optical film. Each edge truss may comprise one or more sides configured from a corresponding fold in the at least one piece of optical film, wherein at least one of the one or more sides of each edge truss may be configured at an angle relative to the front light-emitting side of the at least one piece of optical film to impart support to the lens apparatus and to resist deflection of each edge truss.

In an example embodiment of the disclosed technology, a lens apparatus may comprise at least one piece of optical film that may comprise two opposing support edges, wherein an area between the two opposing support edges may define a lens plane. Each opposing support edge may comprise an edge truss configured along all, or a substantial portion of a corresponding support edge of each opposing support edge, wherein each edge truss may comprise one or more edge truss sides configured from folds in the at least one piece of optical film. The lens apparatus may also comprise two opposing unsupported edges that may be configured to be suspended between the two opposing support edges. The at least one piece of optical film may be configured for suspension between the two opposing support edges when the two opposing edge trusses, or regions adjacent to the two opposing edge trusses are attached in proximity to two opposing edges of a light fixture aperture.

In an example embodiment of the disclosed technology, a lens apparatus may comprise two pieces of optical film wherein each piece of optical film may comprise two opposing support edges, wherein an area between the two opposing support edges of each piece of optical film may define a lens plane. Each opposing support edge may comprise an edge truss configured along all, or a substantial portion of a corresponding support edge of each opposing support edge, wherein each edge truss may comprise one or more edge truss sides configured from folds in the at least one piece of optical film. The lens apparatus may also comprise two opposing unsupported edges that may be configured to be suspended between the two opposing support edges. In an example embodiment, one support edge of each piece of optical film may attach to a lens attachment feature on opposing sides of an elongated heat sink. The other support edge of each piece of optical film may be configured for attaching in proximity to two opposing corresponding edges of a light fixture aperture. The elongated heat sink may be configured for attachment to one or more linear LED arrays, wherein the elongated heat sink may be configured for attachment in proximity to the light fixture aperture.

In an example embodiment of the disclosed technology, a lens apparatus may comprise at least two elongated frame members capable of attaching in proximity to two opposing edges of a light fixture, wherein the two opposing edges of the light fixture may define a light fixture aperture. The lens apparatus may further comprise at least one piece of optical film that may comprise two opposing support edges, wherein an area between the two opposing support edges may define a lens plane, wherein each support edge may be configured for attachment to one of the two elongated frame members. The lens apparatus may also comprise two opposing unsupported edges configured to be suspended between the two support edges, wherein each opposing support edge of the at least one piece of optical film may be attached to corresponding elongated frame members. The at least one piece of optical film may be configured for suspension between the two elongated frame members when the two elongated frame members are attached in proximity to two opposing edges of the light fixture.

DETAILED DESCRIPTION

Embodiments will be described more fully hereinafter with reference to the accompanying drawings, in which example embodiments are shown. The disclosed technology may, however, be embodied in many different forms and should not be construed as limited to the embodiments set forth herein; rather, these embodiments are provided so that this disclosure will be thorough and complete, and will fully convey the scope of the embodiments to those skilled in the art.

It should be clearly understood that the embodiments described herein are examples, and may be adapted for use with many different designs and configurations including, but not limited to: different dimensions, different optical film configurations, different mounting configurations, different fabrication materials, different light fixture enclosures etc.

Various methods, concepts, designs, and parts may be combined to produce desired operating specifications for light fixtures, light fixture retrofits, lenses, film assemblies according to example embodiments, and will be described with reference to the accompanying figures.

Various types and aspects of optical films that may be originally designed primarily for use with display backlight units will be subsequently briefly described. Their configurations, photometric performance, advantages and disadvantages with respect to their utilization with example embodiments of lens assemblies and light fixtures may vary. In addition, photometric requirements for different light fixtures may vary widely based on their configurations and intended applications. Accordingly, when example optical film configurations are described in example embodiments, such as the type of lenticular optical films or diffusion films, they may be construed as illustrative examples only, and should not be construed to in any way to limit the scope of possible optical film configurations. Any types of optical films that may be advantageous to a particular lens assembly, light fixture or lighting application thereof, may be construed as to be intended in any relevant example embodiments.

For brevity, elements, principals, methods, materials or details in example embodiments that are similar to, or correspond to elements, principals, methods, material or details elsewhere in other example embodiments in this application, or related applications, may or may not be repeated in whole or in part, and should be deemed to be hereby included in the applicable example embodiment.

Backlights units (BLU), as used in LCD displays for example, in a basic form, may include a light source, a rear reflector, a diffuser plate disposed in front of the light source, a lenticular optical film disposed on the diffuser plate, and a diffuser film disposed on top of the lenticular film. Together, these elements may form a "light recycling cavity" or LRC.

The principles of lenticular optical films and BLUs are well known and understood to those skilled in the arts, and for brevity, they will not be discussed at length here. However, generally speaking, lenticular optical films typically have a smooth surface, and a structured surface. Off axis light incident on the smooth surface of the film may be refracted through the film, more towards the normal of the axis of the structured surface. A significant portion of light rays incident on the smooth surface of the lenticular film may be reflected backwards, becoming further scattered by subsequent multiple reflections within reflection cavity, until their angles of travel allow them to refract through the lenticular film, and exit the BLU. This recycling of light significantly increases light scattering within the BLU, and has the advantage of increased illumination uniformity across the optical aperture, and increased lamp hiding. Another advantage of BLUs is increased light output intensity due to the condensing of the light distribution pattern more towards the normal of the axis of the optical aperture.

A common lenticular optical films for BLU's may typically be prismatic films such as 3M BEF. Prismatic films typically include rows of triangular prisms, and may be able to increase maximum light intensity in a BLU by up to 70% or more with a single sheet. In addition, the proportion of incident light striking the smooth surface of the film that may be recycled may be as much as 50% or more. While significant light recycling and light intensity increase are advantages in some applications, drawbacks include the need for a top and bottom diffuser to be utilized along with the prismatic film, in order to minimize the optical artifacts of the film's operation, and a top surface covering the structured surface of the prismatic film may be desirable to protect the film. These extra films may increase costs, and may decrease efficiency. Additionally, the high degree of light condensing may come at the expense of narrowed viewing angles, which may not be advantageous in some applications. Viewing angles of BLUs with prismatic film may also be asymmetrical, which may not be ideal in some applications.

Another common lenticular film used in BLUs is lenticular diffusion film such as Kimoto Tech GM3. In a common typically used example, a lenticular diffusion film may include a diffusion surface that includes glass beads deposited on the front surface of a transparent optical film such as polyester, which may have the effect of diffusing light that refracts through the film, as well as condensing the light. The degree of condensation of refracted light, as well as the degree of light recycling may be less than that of typical prismatic films. However, two or three sheets of lenticular diffusion film may be used together to significantly increase the amount of light condensing, light recycling and diffusion properties.

Lenticular diffusion films may have certain advantages over prismatic films in some applications, including:
a) The light distribution pattern of light refracted through the film may be relatively symmetrical, which may be an advantage when utilized in some applications.
b) The viewing angle may be wider, which may also be an advantage when utilized in some applications.
c) Combining multiple films together may be utilized to customize the viewing angle, customize the diffusion level, and maximum the light intensity increase.
d) Lower manufacturing costs may be achieved due to the potential decrease in the number of films needed.
e) Higher overall optical efficiency may be achieved.

BLUs may typically utilize a diffuser plate, which may function to diffuse light from the light source, as well as light reflected backwards from the lenticular film. The diffuser plate may also function as a flat rigid surface on which to mount optical films, which may comprise one or more lenticular films, polarizing film, diffusion film etc. Diffuser plates, may have the disadvantage of being thick, and incur a relatively large light loss due to absorption when compared to diffusive optical films; however they may be widely used due to their function as a suitable flat rigid mounting surface for the optical films.

BLUs are utilized extensively throughout the world in displays, such as in televisions, computer displays etc., and as a result, the market for BLU optical films such as lenticular and lenticular diffusion films is very competitive, which has led to very competitively priced films.

Optical films designed for BLU's generally range in total thickness between 100 um and 290 um, and may be cut into sheets from roll form. Accordingly, the optical films are typically very flexible, and have typically required a rigid flat surface to mount to, in order to keep them flat and free from distortions.

The continuing long felt need for lenses for lighting fixtures which can provide the required light control, but do so with improved efficiency and lower manufacturing costs may be met if some or all of the beneficial aspects of BLUs and optical films designed for BLUs as described, could be utilized in a lens system for lighting fixtures.

According to example embodiments, a lens is provided wherein one or more optical film sheets may be configured into a lens that is suitable for use with a light fixture, wherein the one or more optical film sheets do not require a frame or tensioners in order to remain substantially flat and substantially without distortions when suspended along a portion, or all of its perimeter edges. An advantage of lower manufacturing cost may be achieved in example embodiments of frameless optical film lenses where the optical films are suspended without the use of a tensioning frame or a rigid or semi rigid surface or substrate, or additional parts.

Optical film is typically manufactured in roll form. Typical thicknesses of the substrate (usually polyester or polycarbonate) with a structured surface coating may be up to approximately 300 um. Optical films of greater thicknesses may be able to be custom manufactured, but the cost of manufacturing may be significantly higher. For purposes of this application, optical films shall include all transparent or translucent film materials capable of modifying light, and which are flexible enough to crease, score or fold without breaking.

In accordance with example implementations of the disclosed technology, the optical film's substrate may typically be polyester or polycarbonate, having thicknesses of up to 300 um. Such films may be flexible, and if utilized in a conventional approach without the benefit of the disclosed technology, may not be able to lay in an acceptably flat configuration without the use of a flat substrate to mount on top of, such as a diffuser plate, or without being tensioned on a frame. For example, a conventional 2'×2' recessed "troffer" lighting fixture may have a doorframe with a typical acrylic prismatic lens mounted therein, wherein the lens may be suspended and supported around its perimeter by the doorframe. The lens may typically be approximately 3175 um thick. For example, a 250 um optical film by contrast, is approximately $\frac{1}{12}$ as thick.

It would indeed be a new and unexpected result to those skilled in the arts if a 250 um optical film could be suspended on an example doorframe as described, and could lie acceptably flat without requiring a tensioning frame, additional parts, or a flat substrate to support it. Optical films that possess advantageous characteristics, such as high efficiency, high efficiency/diffusion ratio, lenticular properties, low cost etc., have been commercially available for many decades. The lighting industry throughout the world is a very large industry, with sales that may be in the many tens of billions of dollars per year. Despite the advantages of optical films as described, and the numerous lighting industry designers, engineers, inventors, product developers, scientists, entrepreneurs etc. that have been trying to achieve improved lens optical performance at a lower cost throughout the many decades, may so far have not envisioned the new and unexpected results possible with example embodiments which will now be described.

FIG. 1 depicts a perspective view of an optical film piece 1000 in a flat configuration. The film piece 1000 may be cut to an appropriate size from a roll of optical film. The optical film can comprise any type, such as lenticular film, diffusion film, holographic film etc. Film with a total thickness of greater than approximately 200 um, and preferably about 280 um have been found to exhibit an acceptable degree of structural rigidity in example embodiments for lens configurations in which the optical film (lenses) are suspended over spans of about 22". Thinner films may still yield acceptable results. The particular thicknesses of optical films that will yield acceptable rigidity may depend on the particular distance the film is required to span, the particular configuration in which the perimeter of the lens will be supported, and the optical film's properties.

Figure 2:
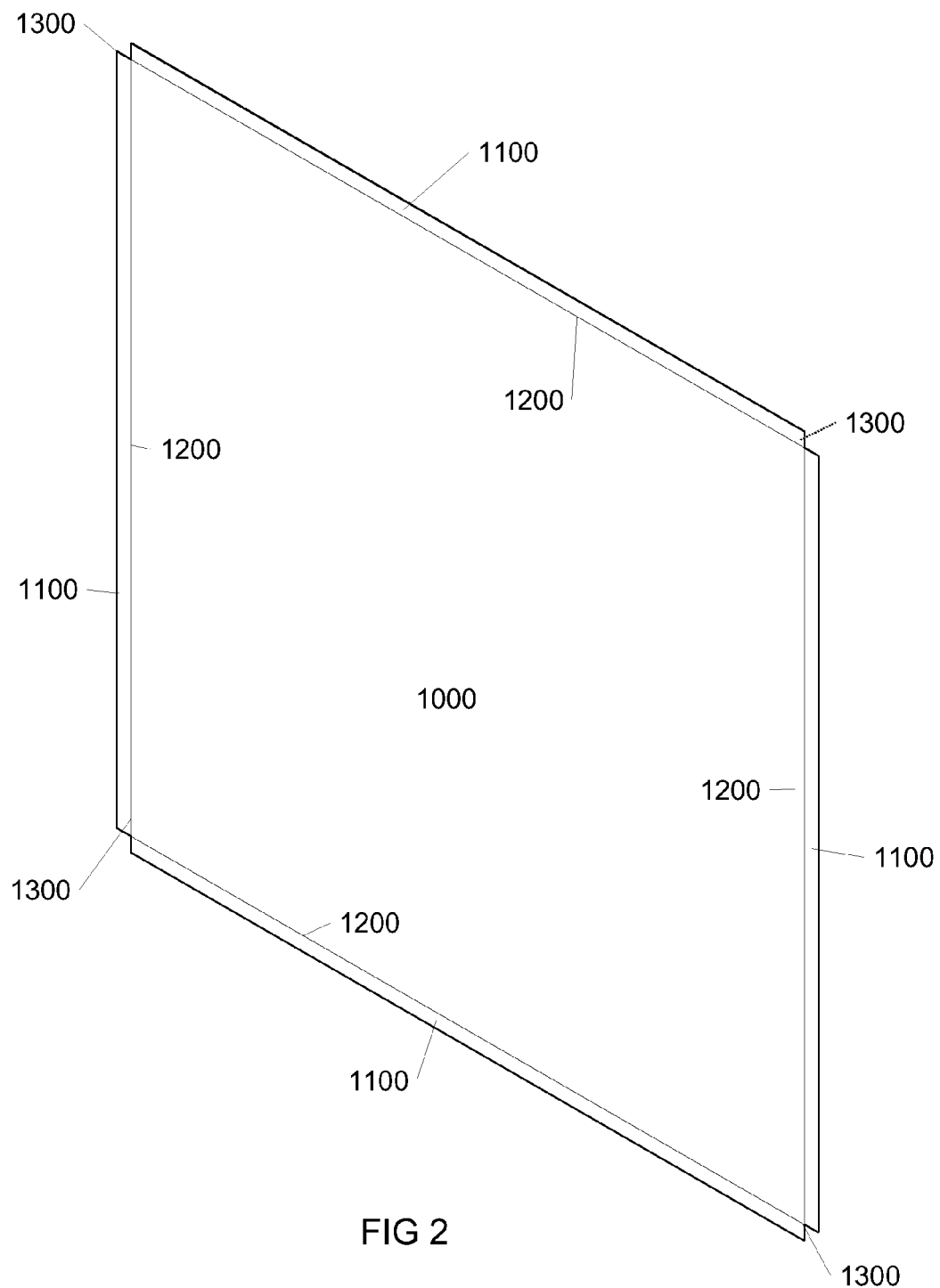
FIG. 2 depicts a perspective of the optical film shown in FIG. 1 with one score line per edge and the corners cut.

FIG. 2 depicts the same optical film piece 1000 as FIG. 1 in which, according to certain example implementations, include score lines, crimp lines, or perforated lines 1200

(which may be collectively referred to herein as "score lines") that may be cut, impressed, and/or etched along each edge on either side of the optical film 1000. In certain example implementations of the disclosed technology, the score lines may enable the optical film to be folded accurately along the lines. In the example figures, feature numbers may only be indicated for one side of the optical film piece, since the other three sides may have similar or identical features.

In an example implementation, the score lines may be made manually by applying pressure to a sharp pointed tool, for example, and drawing the tool across the film against a straight edge, such as a ruler. In another example implementation, the score lines may be perforations made with a hand held perforation wheel drawn against a straight edge. In an example implementation, creating a crimp line may involve crimping the film. For example, a wheel with a convex outer edge, such as a "V" shaped edge, may be rolled under pressure over one surface of the film against a wheel with a reciprocal concave surface on the other side of the film. The result may be a depression or ridge in the film that may enable acceptable folds to be created along their lengths. In an example implementation, the back unstructured side of the optical film may be the preferred side to create the score lines, because the film may be folded towards the back unstructured side of the optical film 1000. Score lines on the front structured side of the optical film may be visible in some applications.

Any other method of scoring/perforating/crimping the optical film may also be used. Creating the score lines may be done on machinery, which may be the most efficient and cost effective method. For example, according to one example embodiment, crimping may involve inserting an edge of the film 1000 into a vice-like mechanical structure and applying a bending force on the film 1000 with respect to the mechanical structure. Film conversion factories have automated machines specifically to cut, score, crimp and perforate optical films. One example of a machine that may be suitable to create the score lines may be an x-y film-cutting plotter made by Graphtec America. A cutting and scoring template can be created on software that can be executed by the plotter.

Scoring of the one or more optical films may be unnecessary in circumstances where mechanical folding machines are utilized, and wherein the particular machine and optical film combination will yield acceptably accurate folds. Accordingly, the steps of creating score/crimp/perforation lines in the one or more optical films may be optional steps in any of the example embodiments if mechanical folding apparatuses can adequately create the required folds.

According to an example implementation, when the edge sections 1100 of optical film 1000 are folded along the score lines 1200 away from the front structured side of the film 1000, a side edge may created, herein referred to an "edge truss". When the optical film is configured with additional score lines 1200 additional edge sections 1100 and edge trusses for each side of the optical film piece 1000 may be created, and will be described in subsequent example embodiments.

Figure 3A:
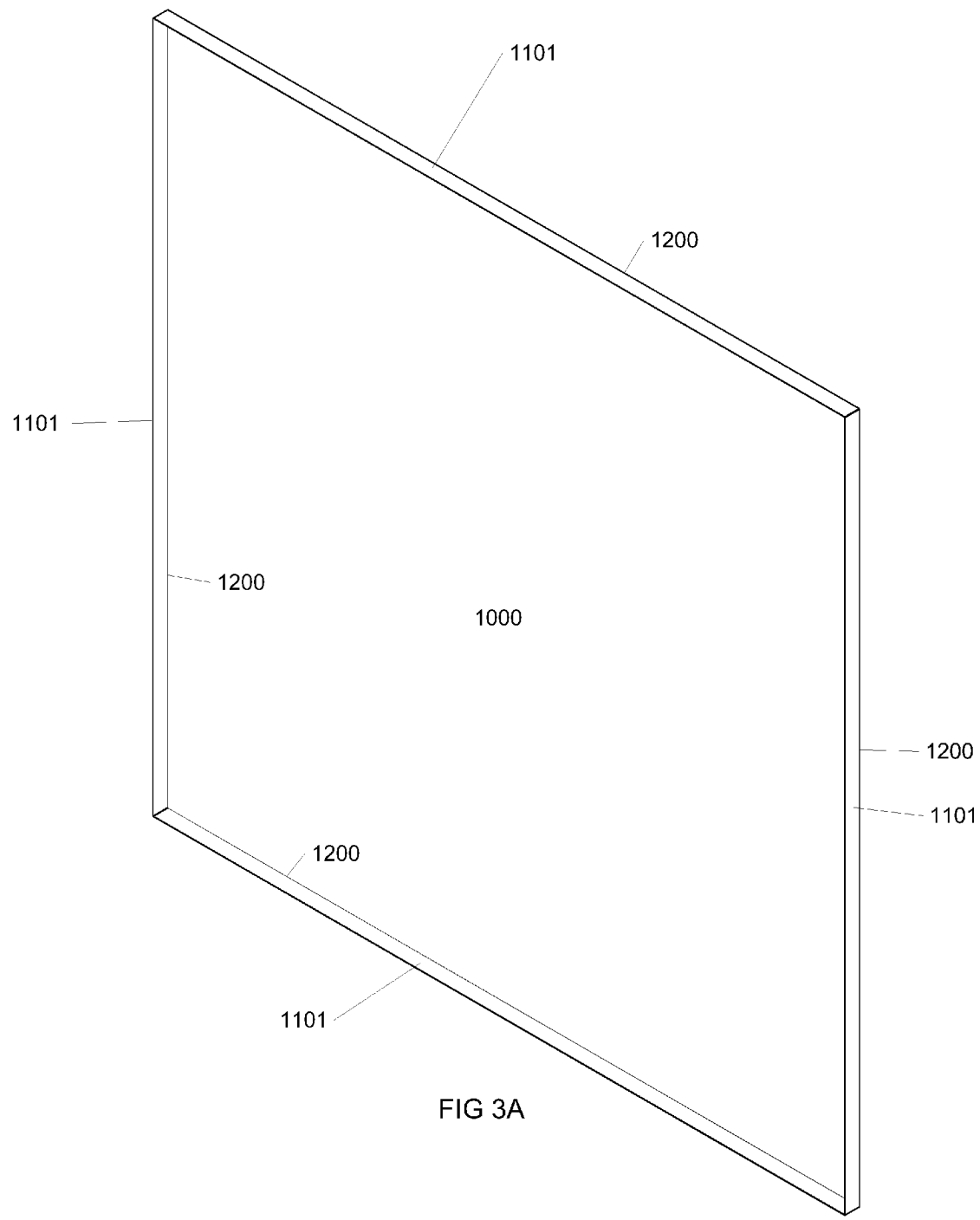
FIG. 3A depicts a perspective view of an example embodiment of a frameless optical film lens with one-sided edge trusses.

FIG. 3A depicts the same optical film as shown in FIG. 2, but with the edge sections 1100 folded. In an example implementation, the optical film piece 1000 may have the structured front surface of the film facing away from view. The optical film shown in FIG. 3A is depicted with folds along each of the score lines 1200, with folds oriented away from the structured surface of the optical film to form one-sided edge trusses 1101 made from the edge sections (for example, the edge sections 1100 in FIG. 2) for each edge of the optical film piece. The edge trusses 1101 may be folded to an angle of about 90 degrees or greater. The optical film 1000 with edge trusses 1101 as shown may comprise an example embodiment of frameless optical film lens, which may be suitable for use with a lighting apparatus or light fixture.

Utilizing one edge truss 1101 per lens side may have an advantage of lower manufacturing cost when compared to the other example embodiments due to the lower surface area of optical film used, and less score lines and folds per side. Although this example embodiment may have less structural rigidity than other example embodiments, it may have sufficient rigidity for many applications.

In example embodiments, the optical film piece may be configured with one or more cutout portions at the corners. For example, in certain implementations, the corners may be cut to an angle of about 45 degrees as a manufacturing aid to allow sections of film on one side of an optical film piece to be folded without contacting folded sections on an adjacent side of the optical film piece. Other cutting and cutout patterns in the corners may be utilized that are suitable for the required application. For example, a square corner cutout pattern 1300 as shown in FIG. 2, when folded along the score lines 1200, may yield a final configuration as shown in FIG. 3A. This configuration may be suitable for some applications. In some applications, adhesive tape may be applied to the corners to give additional structural stability to the corners.

Figure 3B:
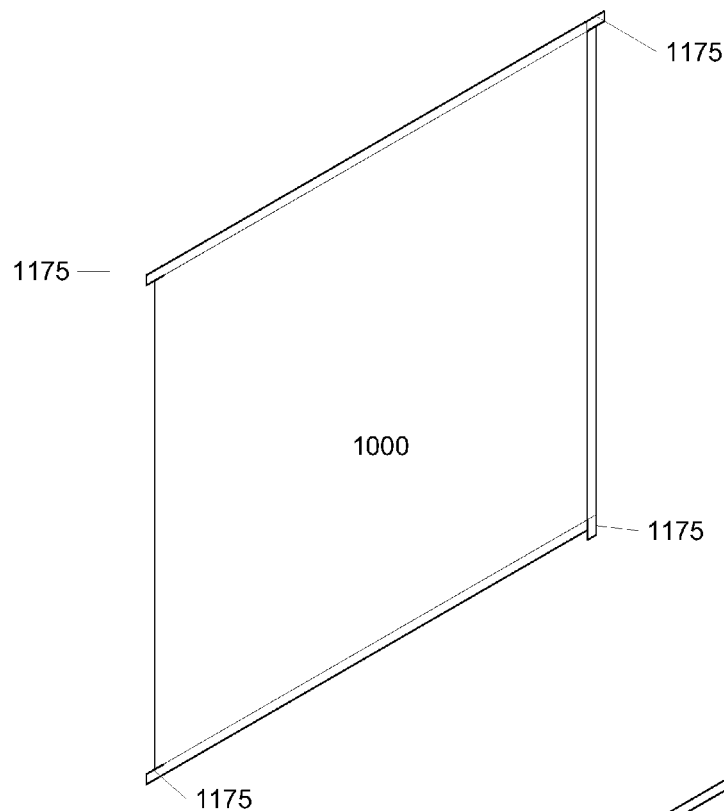
FIG. 3B depicts a perspective of an optical film configured with one score line per edge and configured with corner tabs.
Figure 3C:
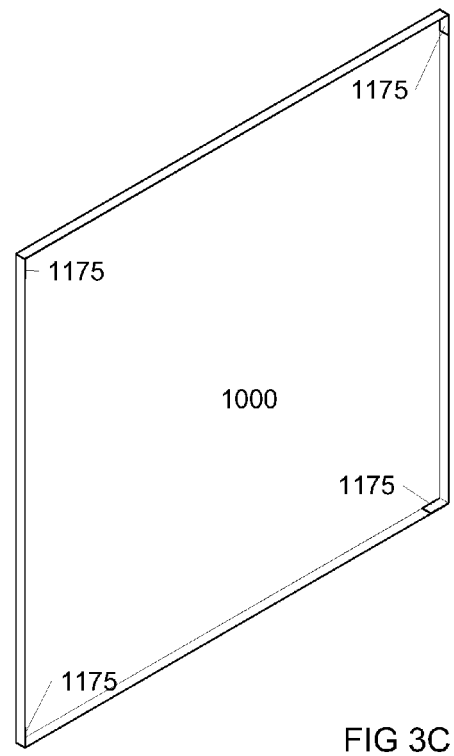
FIG. 3C depicts a perspective view of an example embodiment of a frameless optical film lens with one-sided edge trusses and corner tabs.

In one example implementation, as shown in FIG. 3B, the optical film sheet 1000 may be configured with tabs 1175. When folded, as shown in FIG. 3C, and according to one example implementation, the tabs 1175 from each side may overlap the adjacent edge truss. According to an example implementation of the disclosed technology, the tabs 1175 may secured with adhesive, adhesive tape, metal or plastic rivets etc. This type of corner configuration may give a more professional visually pleasing appearance to example embodiments of frameless lenses. Certain example implementations (for example, as depicted in FIG. 3C) may include one edge truss per side. Other example embodiments may include tabs 1175 that may be configured on any edge truss corner of example embodiments, and with multiple edge trusses per side.

According to certain example implementations of the disclosed technology, edge trusses may create sufficient rigidity to allow the lens (for example, made from an optical film sheet) to define an acceptably flat surface when supported along all, or a portion of its perimeter. For example, certain lens mounts may include a mounting channel in a doorframe of a recessed troffer lighting fixture. Through experimentation, it has been determined that two-sided edge trusses may create sufficient rigidity along each edge of the optical film in applications utilizing an example embodiment of frameless lens with an optical film thickness of over 250 um, and suspended over a span of about 22". Once the required threshold of rigidity along the edges of the optical film is met, adding further rigidity to the edge trusses may not affect the ultimate flatness of the lens surface. Accordingly, adding bracing of any type to the edge trusses, such as right-angled extrusions, flat bars, extruded clips attached to the film edges, or adding corner braces to the corners, may not enhance the flatness of the lens surface. Such bracing may however, function to improve the cosmetic appearance, serve to enable easier mounting or attachment to a light fixture in some applications, and may also create a more robust lens which may be able to accept a higher degree of abuse during handling, mounting or dismounting. Accordingly, any such additional support or bracing as described may be a matter of design choice or preference, rather than a functional requirement for an acceptably flat lens configuration. According to an example implementation of the disclosed technology, three or more edge trusses may be configured into example embodiments, and may serve to make the lens more mechanically robust, which may be advantageous during installation, and may give a more professional and substantial appearance.

Figure 6A:
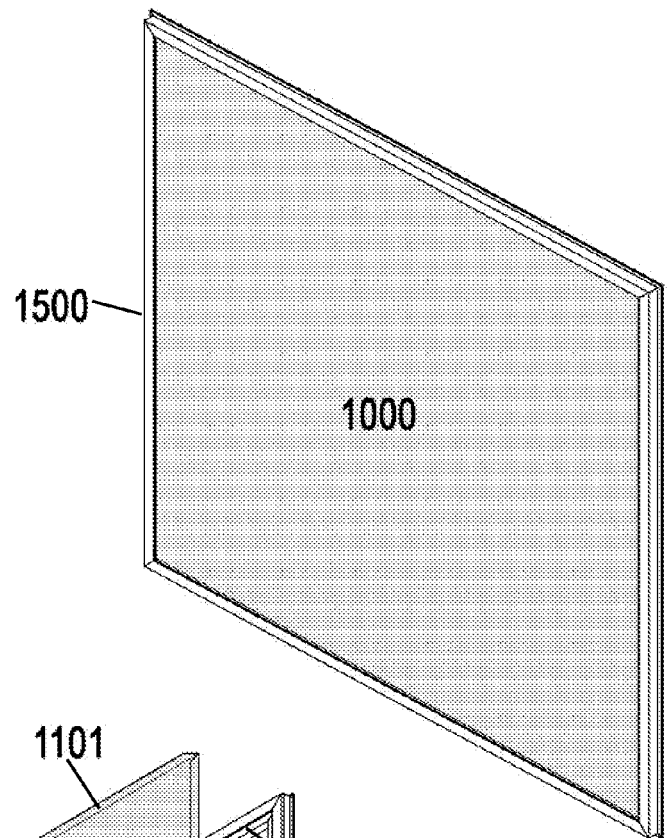
FIG. 6A depicts a perspective of the example embodiment of a frameless optical film lens mounted in a light fixture doorframe.
Figure 6B:
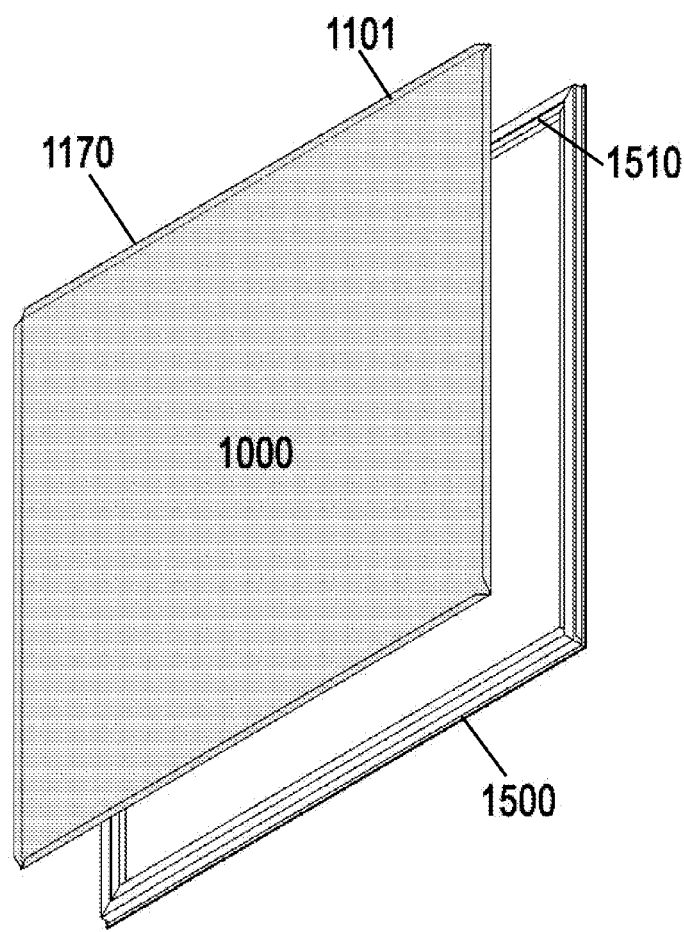
FIG. 6B depicts an exploded perspective of the example embodiment of a frameless optical film lens mounted in a light fixture doorframe.

According to certain example implementations of the disclosed technology, edge trusses may also function to help hold the lens in place within a light fixture lens-mounting channel, as shown in FIGS. 6A and 6B. For example, FIG. 6A depicts a rear perspective view of a simplified lens doorframe 1500 from a typical recessed troffer light fixture with an example embodiment of frameless lens 1000 with one-sided edge trusses mounted inside the doorframe 1500. FIG. 6B depicts the lens-mounting channels 1510 in doorframe 1500 that may house an acrylic lens such as a standard acrylic prismatic lens. In certain example implementations, edge trusses 1101 may be sized such that when mounted into a lens mounting channel 1510, the top edges 1170 of each edge truss 1101 may contact the upper edge of the lens mounting-channel 1510, which may function to hold the lens flat against the bottom edge of the lens mounting channels 1510, and to secure it within the lens mounting channels 1510. Example embodiments with two or three-sided edge trusses 1101 may be configured in a similar manner, wherein the side of each edge truss 1101 which borders on the face of the lens 1000 may be sized wherein the upper edge of the edge truss 1101 may contact the upper edge of the lens mounting channel 1510.

In applications where example embodiments of frameless lenses with film thicknesses of about 280-290 um, and which are required to span distances approximately 22", as may be required for standard 2'×2' recessed troffer light fixtures, edge trusses may be required on all four edges of the optical film, or visually unacceptable sagging of the lens surface may occur. However, in applications where the span that the lens is required to be suspended over is decreased, or the film thickness is increased, it may be possible and/or preferable to utilize an example embodiment with edge trusses being configured on only two opposing sides of the optical film. The advantage of edge trusses on only two opposing edges of the optical film compared to four may be a cost savings realized by less optical film being used, as well as a savings of manufacturing resources used to create score lines and folds on the other two sides. The determination of whether to configure an example embodiment with edge trusses on two or four edges of the optical film may be subjectively based on whether the lens appears acceptably flat when mounted on a light fixture. Simple experimentation and observation with optical films having varying numbers of edge trusses may aid in a determination as to the appropriate number of edge trusses that may be included for acceptable film support and flatness. These principles described may be applicable to all example embodiments disclosed herein.

It should be noted that the drawings shown and disclosed herein depict certain example embodiments configured with 90-degree folds. In practice however, when optical film is folded, precise folding angles may not be able to be created due to the elasticity of the optical film's composition and the practicalities of creating folds. For example, a section of 250 um thick optical film folded along a score line may typically be folded to the maximum angle of 180 degrees in order to set the crease. When the folding force is released, the folded section may spring back to approximately 120 degrees, and the folded section may be manually manipulated thereafter to make the desired final fold angle. In certain embodiments, variance in the final fold angles may not affect the functionality of example embodiments with respect to being able to remain substantially flat and without distortions when suspended along a portion, or all of its perimeter edges. In certain example implementations, the initial fold angle and/or the folding method, for example, may be controlled to enhance certain features. For example, in certain example embodiments, the fold(s) may be configured to provide gripping retention with mounting channels associated with a light fixture.

FIG. 7A through 7J depicts cross sectional side views of various example embodiments configured with different edge truss configurations. These example embodiments with different edge configurations represent only some of the configurations possible. The mounting requirements and configuration of each light fixture application may dictate which edge truss configuration may be the most suitable. Other permutations of edge truss configurations not shown in FIG. 7A-7J may also be suitable for a given application, and are to be included within the scope of the disclosed technology.

In accordance with certain example implementations of the disclosed technology, the rigidity of each edge of example embodiments of frameless lenses may increase with the number of folds. With one-sided edge trusses, it may be more important to have the fold angle approximately 90 degrees in order to maximize the rigidity of the edge truss. As previously discussed, when edge trusses with two or more sides are utilized, the edge trusses may exhibit rigidity that may be sufficient for most applications. Accordingly, there may be no requirement to have the folds near 90 degrees, and a relatively wide range of fold angle combinations may be acceptable which may yield acceptable rigidity, for example, as shown in in FIG. 7A-J. The criteria for determination of the fold angles may therefore be a function of lens mounting, installation, required rigidity and cosmetic considerations for a given application.

Figure 4:
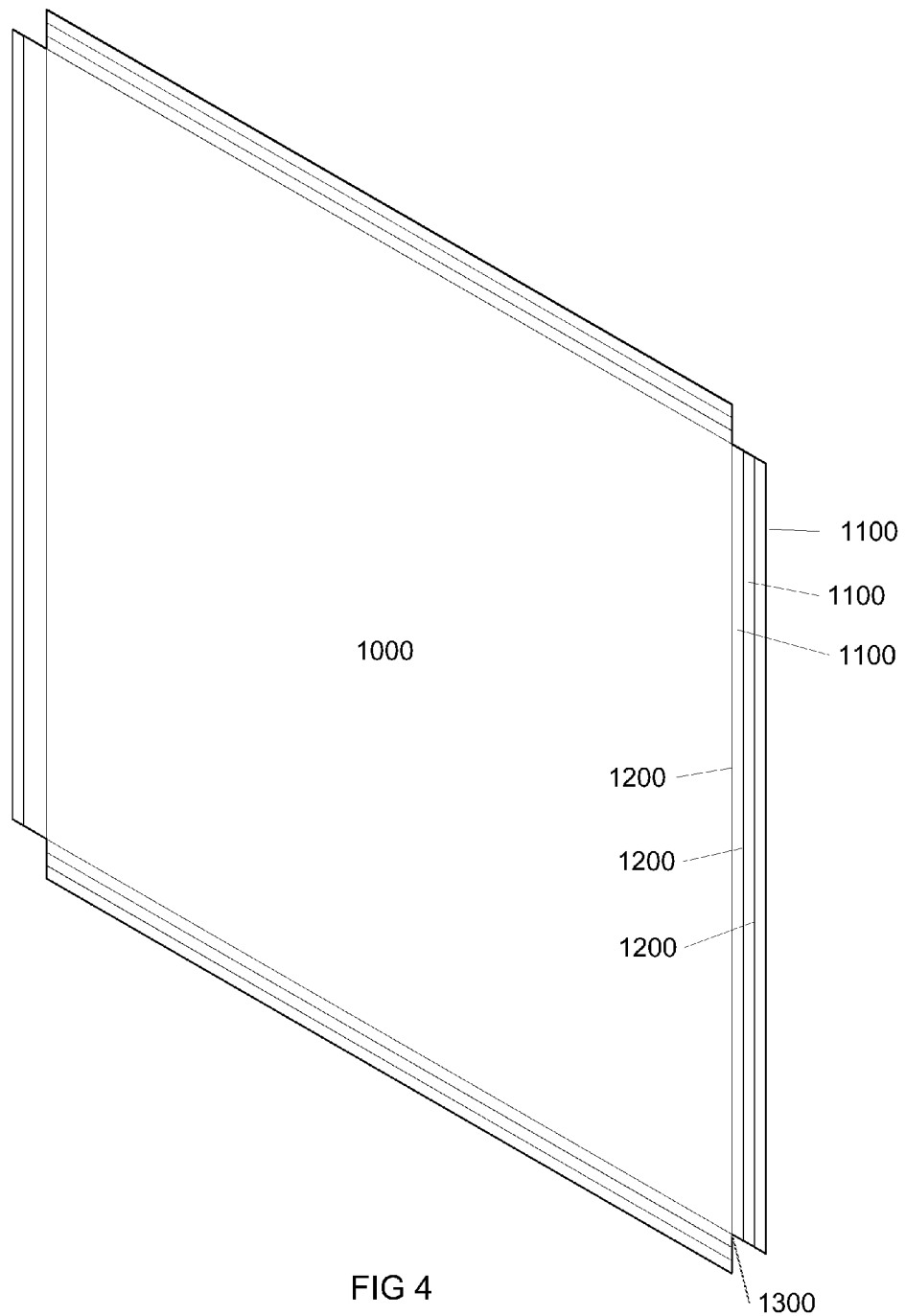
FIG. 4 depicts a perspective of the optical film with three score lines per side and the corners cut.

Another example embodiment of frameless optical film lens will now be described. FIG. 4 depicts a piece of optical film 1000 similar to that of the first example embodiment, with score lines 1200 created as previously described, along with the edge sections 1100 which are created between the score lines. In this example embodiment, two extra score lines per film side may be created such that when the optical film is folded along the score lines, and inward and away from the front structured surface of the optical film, three-sided edge trusses may be created. Again, the corners 1300 may be cut, as previously described.

Figure 5:
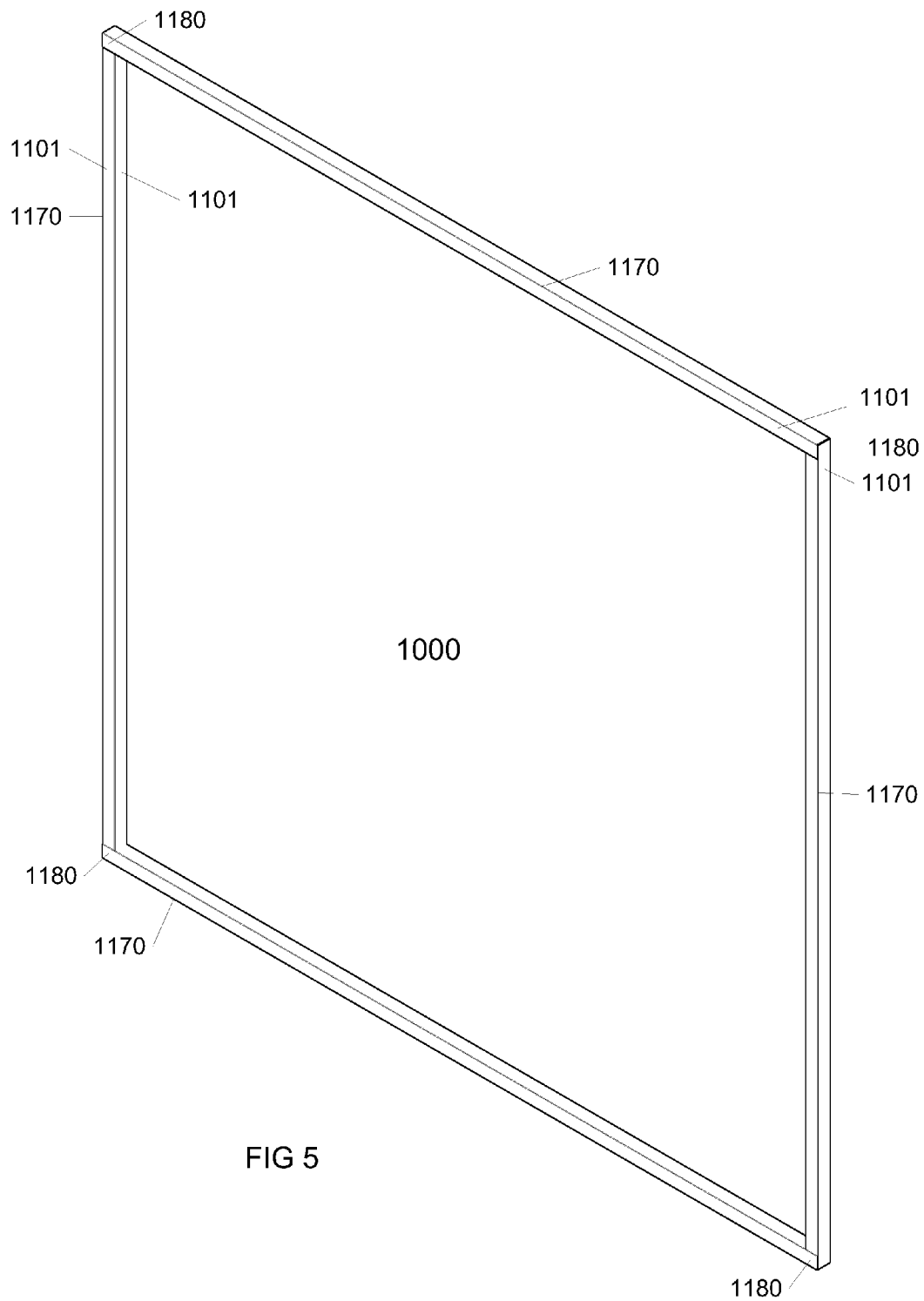
FIG. 5 depicts a perspective view of an example embodiment of a frameless optical film lens configured from the optical film depicted in FIG. 4, which may comprise three-sided edge trusses.

FIG. 5 shows a perspective rear view of the example embodiment of frameless optical film lens 1000 with three-sided edge trusses 1101. The edge trusses 1101 as shown, may be in a substantially square configuration. However, in other example embodiments, the fold angles do not necessarily need to be 90 degrees as previously discussed.

As shown in FIG. 5, an edge truss 1101 at each corner may overlap the edge truss 1101 adjacent to it, creating a square overlap area 1180. Adhesive, adhesive tape, rivets or any other suitable method of fastening may be applied to the overlap area 1180 to secure adjacent edge trusses 1101 to each other. The described configuration may give optimal corner rigidity, and may give a professional "finished" look to the lens.

Two optical films may be utilized in example embodiments of frameless optical film lenses, for example, by nesting the second frameless optical film lens inside the first lens, wherein the second lens has been sized slightly smaller, such as approximately 1/16" on each major dimension for example. Subsequent additional optical films may be utilized in any of the example embodiments using the same method. When more than one optical film is utilized in an example embodiment of frameless optical film lens, the additional lenses may not require edge trusses, and may comprise only a piece of optical film that has been sized appropriately to nest inside the first lens. The second or multiple subsequent lenses may be held sufficiently secure within the first lens with example embodiments comprising two or three sided edge trusses 1170. When the first lens comprises only a single-sided edge truss as previous described, staples or adhesives etc. may be utilized if necessary. In addition, the second or subsequent lenses may be configured with edge or corner tabs that may be folded and attached to the edge trusses of the previous lens with rivets, adhesive tape etc.

Figure 7A:
FIG. 7A depicts a cross sectional profile view of an example edge truss configuration.
Figure 7B:
FIG. 7B depicts a cross sectional profile view of an example edge truss configuration.
Figure 7C:
FIG. 7C depicts a cross sectional profile view of an example edge truss configuration.
Figure 7D:
FIG. 7D depicts a cross sectional profile view of an example edge truss configuration.
Figure 7E:
FIG. 7E depicts a cross sectional profile view of an example edge truss configuration.
Figure 7F:
FIG. 7F depicts a cross sectional profile view of an example edge truss configuration.
Figure 7G:
FIG. 7G depicts a cross sectional profile view of an example edge truss configuration.
Figure 7H:
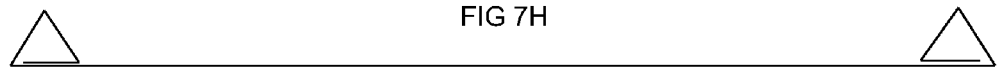
FIG. 7H depicts a cross sectional profile view of an example edge truss configuration.
Figure 7I:
FIG. 7I depicts a cross sectional profile view of an example edge truss configuration.
Figure 7J:
FIG. 7J depicts a cross sectional profile view of an example edge truss configuration.

Certain edge truss configurations, such as the configuration shown in FIG. 7J for example, may be suitable for an example embodiment of frameless lens wherein the lens may mount in a light fixture without requiring a doorframe. FIG. 8B depicts an embodiment of frameless lens 1000 mounted on a typical recessed troffer light fixture enclosure 1500, and FIG. 8A depicts an exploded view of FIG. 8B. FIG. 8C depicts the frameless lens 1000 from FIG. 8A and FIG. 8B upside down, wherein the visible lens surface faces the inside of the troffer enclosure 1500. The lens may be configured with three edge trusses 1101 per side, wherein an example profile of the edge truss configuration is shown in FIG. 7J.

Referring to FIG. 8A, troffer doorframe lip 1520 may serve to function as the mounting base of frameless lens 1000, where surface 1520 may mate with edge truss surface 1112 on FIG. 8C. In certain example implementations, the surfaces may be secured to each other with hook and loop fasteners, such as low profile Velcro attached to the mating surfaces. In an example implementation, one fastener per corner may be sufficient to secure the frameless lens 1000 to the troffer enclosure 1500.

As an alternative embodiment to hook and loop fasteners, and since light fixture enclosures are typically fabricated from steel, a magnet may be attach to the underside of the edge truss surface 1112 in FIG. 8C of one or more corner of the frameless lens 1000, which may securely attach the lens 1000 to the troffer enclosure 1500 when mated. Both methods described to secure the lens 1000 to the enclosure 1500 may have the advantage of not being visible from outside the enclosure when the light fixture is illuminated. Other example embodiments may utilize fastening clips for securing the lens 1000 to the enclosure. Yet other example embodiments may utilize tabs on the edge trusses that may protrude into holes in the fixture enclosure 1500.

A novel method of attaching an example embodiment of frameless lens to a light fixture enclosure will now be described with reference to FIG. 9B, which depicts a rear perspective view (facing the back of the lens) close up of one corner of an example embodiment of frameless lens. In an example embodiment, the side of an edge truss 1101 may be configured with tabs 1130. In certain example implementations, the flat optical film piece, from which the example embodiment of lens is configured, may include two or more three sided cuts through the film to create tabs. The tab may subsequently be folded outwards towards the outside of the lens as shown.

Figure 9A:
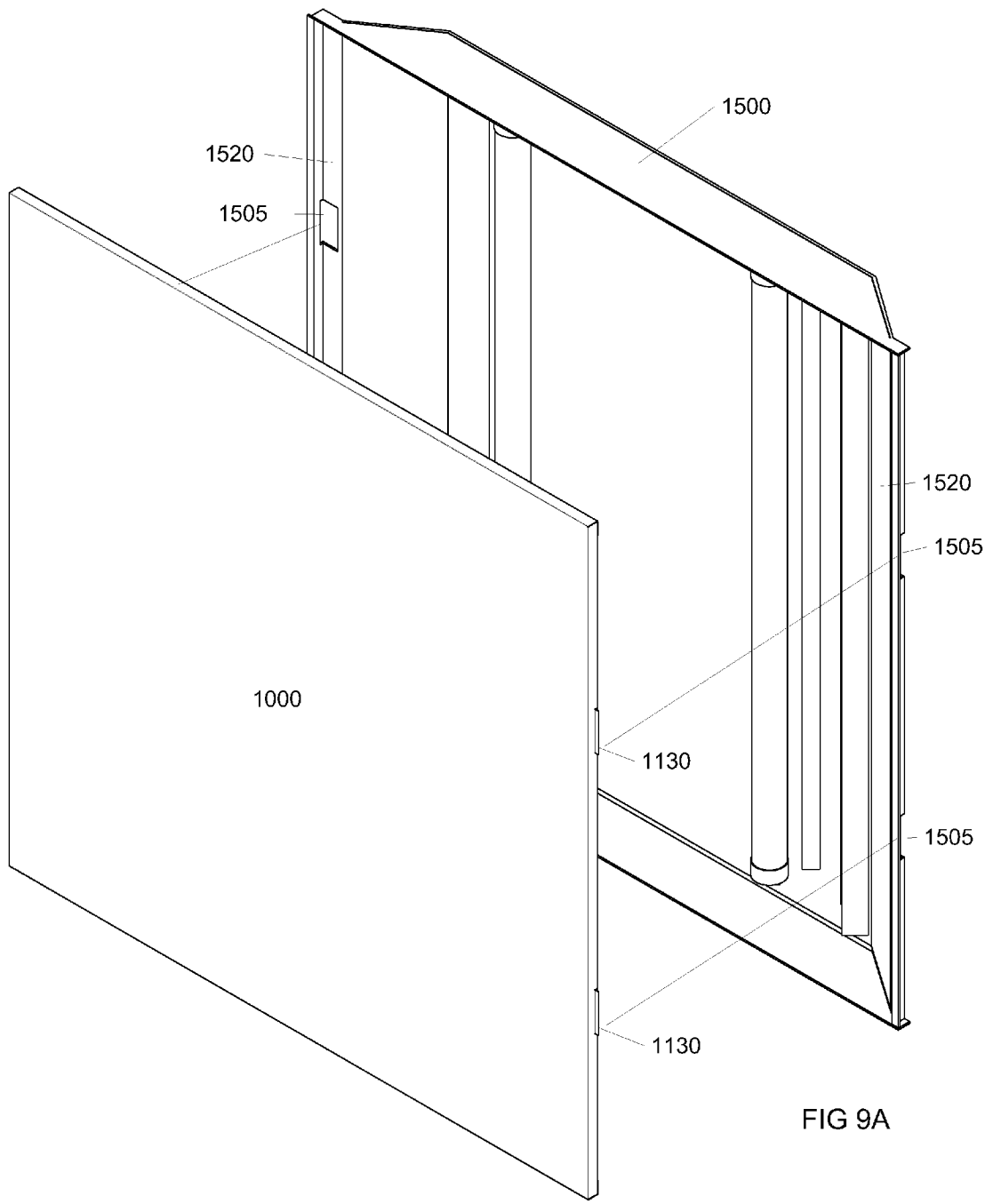
FIG. 9A depicts a perspective exploded view of a troffer light fixture and an example embodiment of a frameless optical lens lens with mounting tabs.

Referring to FIG. 9A, a troffer enclosure 1500 may include slots or holes 1505 near the front edges through which doorframe latches or hinges may attach. The lens 1000 may be inserted into the troffer enclosure 1500 such that the tabs 1130 may nest in holes or slots 1505. When configured with the appropriate size, angle of fold, and placement, the tabs 1130 may protrude through the holes or slots 1505 and contact one or more edges of the holes or slots 1505, wherein the lens 1000 may be held secure against the troffer doorframe lip 1520. The number of tabs per lens required may vary depending on the lens dimensions, light fixture enclosure configuration, and the desired attachment force etc. In certain example implementations, two tabs 1130 per lens may be situated diagonally from each other. In certain example embodiments, this configuration may be the minimum requirement. In other example implementations, two tabs on each of two opposing sides of the lens may be utilized to produce a more robust and stable configuration. In certain example implementations, ease of installation may be a deciding factor in the number and placement of tabs 1130. In certain example implementations, the width of the tabs 1130 may be increased as needed to increase the holding force of the tabs 1130 to the light fixture 1500.

Figure 9B:
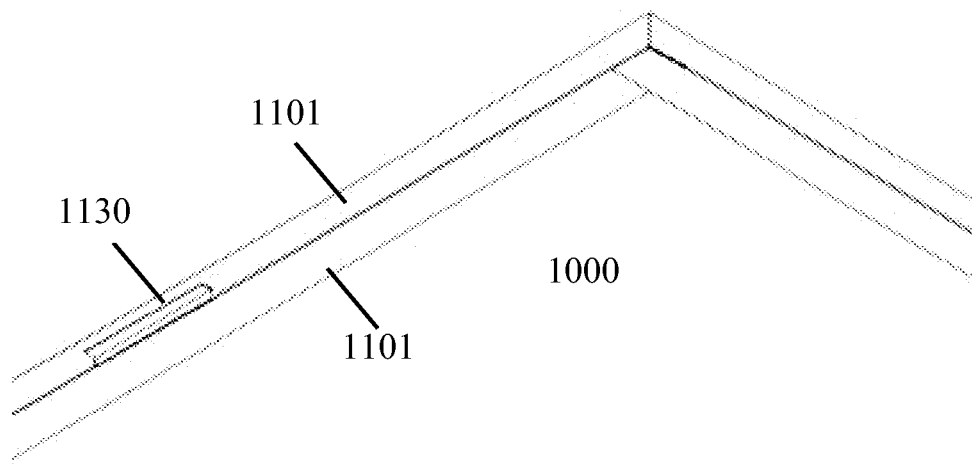
FIG. 9B depicts a close up perspective view of a portion of an example embodiment of a frameless optical lens with mounting tab.

In an alternative implementation of the disclosed technology, plastic or metal rivets, or any type of protuberance may be utilized and fastened to edge trusses in place of the tabs 1130 as shown and described in FIGS. 9A and 9B. For example, plastic rivets such as "push in" plastic rivets with shafts that incorporate locking features may be utilized. Said plastic rivets for example, may have pliable barbs that compress during insertion and subsequently keep the rivet secured within the substrate. The rivets may be installed through holes suitably located on two or more edge trusses on an example embodiment, such that the rivet heads are disposed inside the lens, and the rivet shafts protrude outside the lens. When an example embodiment of lens is installed on a light fixture such as shown in FIG. 9A, the rivet shafts may nest in slots 1505 in a similar fashion to the tabs 1130. Any type of clip that may suitably and securely fastened to edge trusses, and may also securely nest within slots, holes or edges within a light fixture may be utilized. Accordingly, the disclosed novel method of attaching an example embodiment of frameless lens to a light fixture enclosure is not limited to tabs 1130 as shown in FIG. 9A, and may include a wide variety of other mechanical fastening devices without departing from the scope of the disclosed technology.

Certain light fixture enclosures may have ridges, folds or other suitable fastening areas disposed on the inside of the enclosure in proximity to the edge sections of example embodiments, wherein the tabs 1130 may nest inside the ridges, folds, or other suitable fastening areas, instead of slots or holes 1505.

The example embodiment of frameless lens described may have several advantages. Typical troffer light fixtures utilize doorframes (such as doorframe 1500 shown in FIG. 6B). Such doorframes may include multiple parts, such as frame members, hinges, clasps, rivets etc, and together with assembly labor, may comprise a significant manufacturing cost. Example embodiments of frameless lenses may eliminate the need for all (or a portion of) a doorframe, along with the associated costs and weight.

Typical doorframes may be approximately ⅝" wide, which may comprise a total surface area of approximately 55 sq. in for a 2'×2' fixture, which may reduce the usable surface area of the optical aperture of the light fixture by that amount. The example embodiments of frameless lens may have the advantage of utilizing substantially a light fixture's entire optical aperture, and may increase the usable surface area of the optical aperture by approximately 10%. This may increase the efficiency and light dispersion pattern of the light fixture, and may be visually more pleasing.

An embodiment of a frameless optical film lens with a curved lens face will now be described. FIG. 10A shows an example inside perspective view, and FIG. 10B shows an example outside perspective view of an example embodiment that utilizes a curved lens face 1000. An example embodiment may include an optical film center section 1011, and two optical film side sections 1010. In one example implementation, the center section 1011 may be curved, and may protrude past the edge trusses 1101. Accordingly, the lens may protrude outside a light fixture enclosure, and if the light fixture face is mounted flush with a ceiling, the lens may protrude below the ceiling line. This example embodiment may possess several advantages over other example embodiments with flat lens faces. The lamp to lens distance, for example, may be effectively increased without the modification of the light fixture. Modification of the depth of a light fixture enclosure may incur significant costs such as retooling, additional manufacturing costs etc. Increasing the lamp to lens distance may have the advantage of increased diffusion and lamp hiding. Because of increased diffusion, the haze rating of an optical film(s) utilized may be decreased in order to achieve a similar diffusion level when compared to the same light fixture with an example embodiment characterized by a flat lens face with a shorter lamp to lens distance. This decrease in haze rating of the optical film may result in increased efficiency of the light fixture while exhibiting similar overall diffusion and lamp hiding.

Another advantage of the example embodiment may be significantly increased visual appeal without a significant increase in manufacturing cost compared to other example embodiments with flat lens faces. For example, a conventional one-piece acrylic/polycarbonate lens (typically used in light fixtures), with a similar shape to the example embodiments described herein, may require that the lens be manufactured by injection molding or other suitable method, and may not be able to be manufactured by extruding. This may require significant tooling costs, especially on larger sized lens configurations, and the unit manufacturing costs may be significantly higher when compared to extruded lenses. A conventional acrylic lens, similar in shape to the example embodiments disclosed herein, may also have a significant weight, which may require the lens to have a doorframe; the disadvantages of which have been previously described. Additionally, the increased lens thickness and diffusion materials used in conventional configurations may significantly decrease the optical efficiency.

Figure 11A:
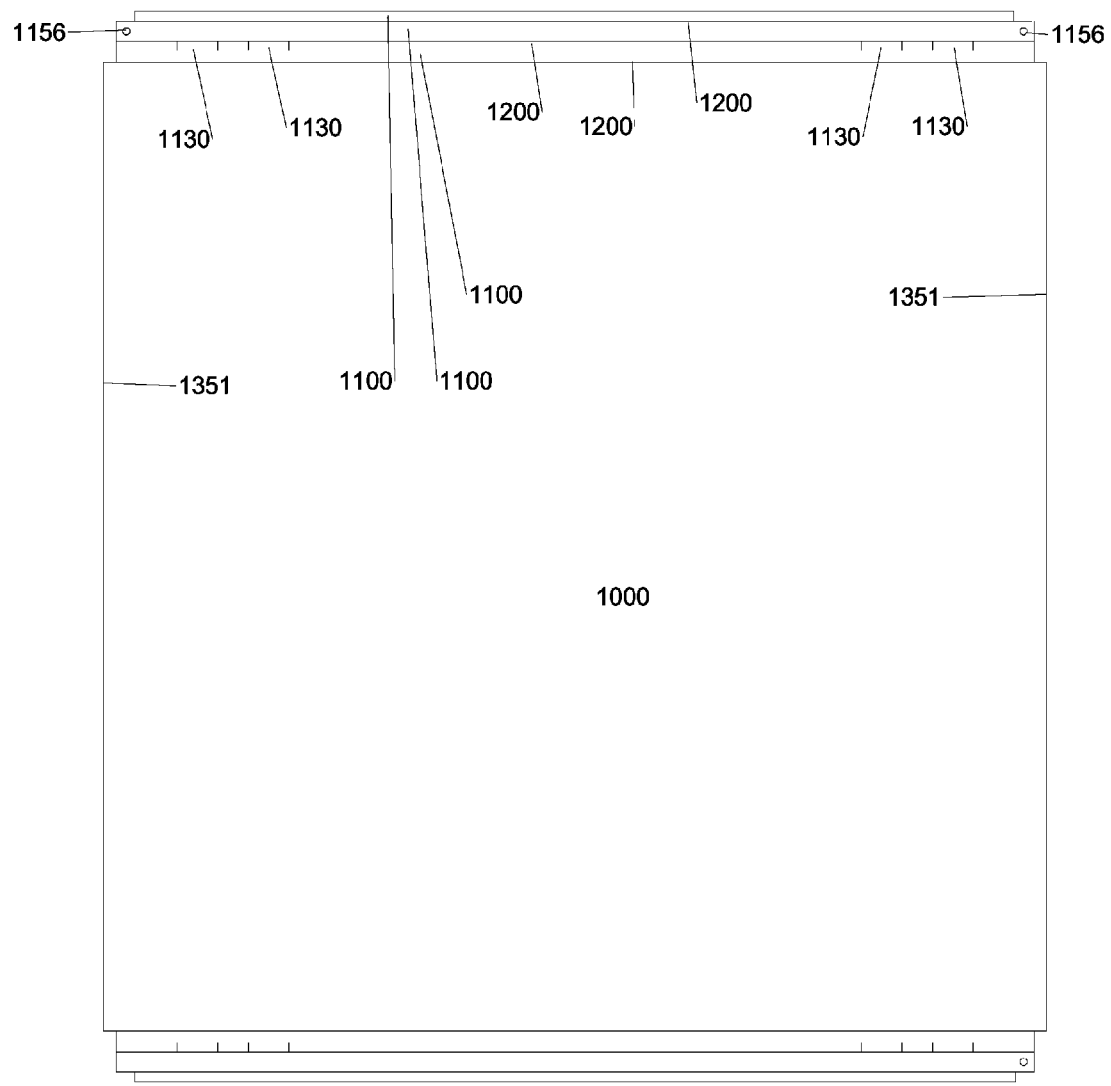
FIG. 11A depicts an optical film cutting template for the optical film center section of the example embodiment of a frameless optical lens as depicted in FIG. 10A.
Figure 11B:
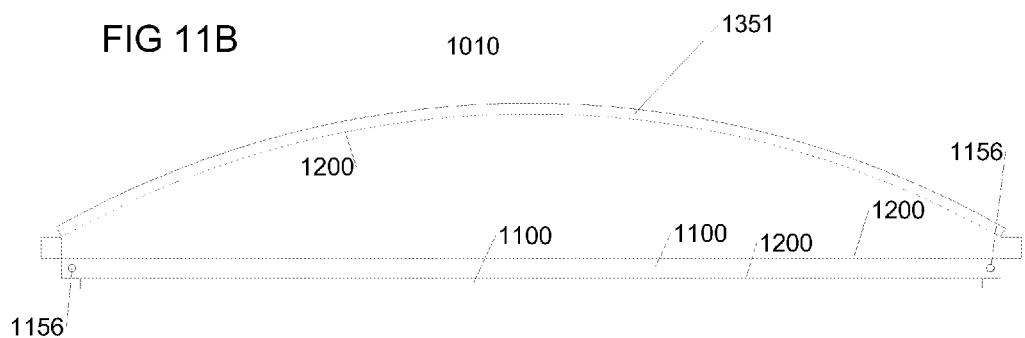
FIG. 11B depicts an optical film cutting template for the side optical film sections of the example embodiment depicted in FIG. 10A.
Figure 11C:
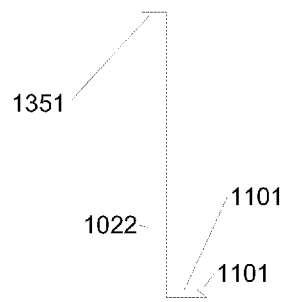
FIG. 11C depicts a side profile view of the configured optical film side sections of the example embodiment depicted in FIG. 10A.

FIG. 11B shows an example cutting template for optical film side sections 1010 of an example embodiment having score lines 1200 and edge sections 1100, as shown. According to an example implementation of the disclosed technology, a curved edge section 1351 may be formed along curved score line 1200. Referring to side profile view FIG. 11C, the optical film from (for example, as shown in FIG. 11B), once folded, may look similar to that as shown in FIG. 11C. For example, a structured surface 1022 of the optical film may be disposed on the outside of the side panel. In one example implementation, a curved edge section 1351 may be inserted into a channel extrusion that will be subsequently described. In an example implementation, the edge section 1100 may be significantly narrower than other edge sections, and the resulting edge truss may be sharply angled as shown, in order to reduce unwanted reflections and light loss within the light fixture/lens cavity. In one example implementation, corner holes 1156, as shown in FIG. 11B, may be configured such that when the lens is assembled, the holes may align with corresponding holes on an adjacent edge truss, and wherein a rivet may be fastened through the aligned holes.

Figure 10C:
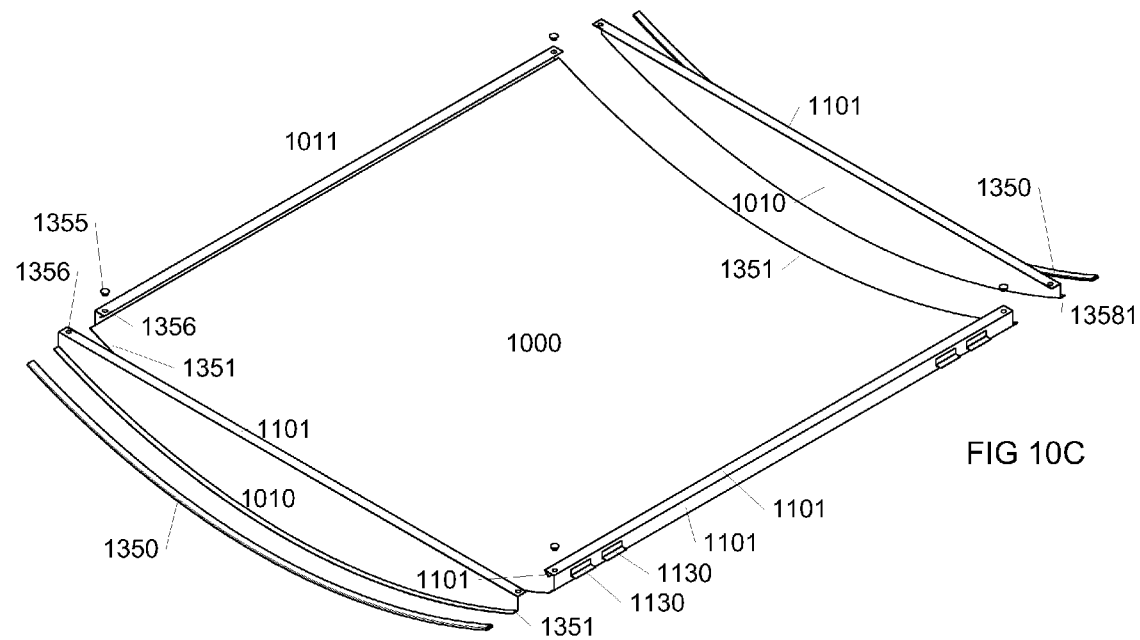
FIG. 10C shows an exploded perspective view of the back side of the example embodiment depicted in FIG. 10A.
Figure 11D:
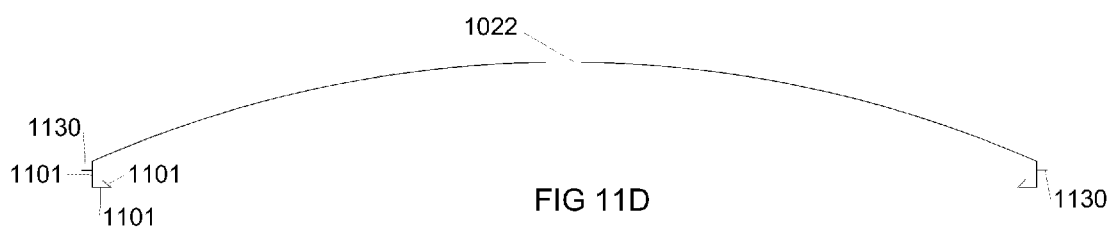
FIG. 11D depicts a side profile view of the configured optical film center section of the example embodiment depicted in FIG. 10A.

FIG. 11A shows an example embodiment of a cutting template for the optical film center section 1011, with a lens face 1000 and score lines 1200 with corresponding edge sections 1100 depicted. Example cut lines are depicted for mounting tabs 1130, along with holes 1156, which may be configured and function as previously described. The edge sections 1351 may subsequently be attached to the corresponding edge sections 1351 on side panels (for example, the side panels 1010 shown in FIG. 10A). An example implementation of a side profile of the configured curved section is shown in FIG. 11D. In this embodiment, the structured surface of the lens face 1022 may be disposed on the outside of the lens. The edge sections 1100 may be configured in a similar manner to the edge sections of the optical film side sections as previously described. Mounting tabs 1130 may be folded outwards as shown, and may function to fasten the lens assembly into a light fixture as described in a previous example embodiment.

Figure 10D:
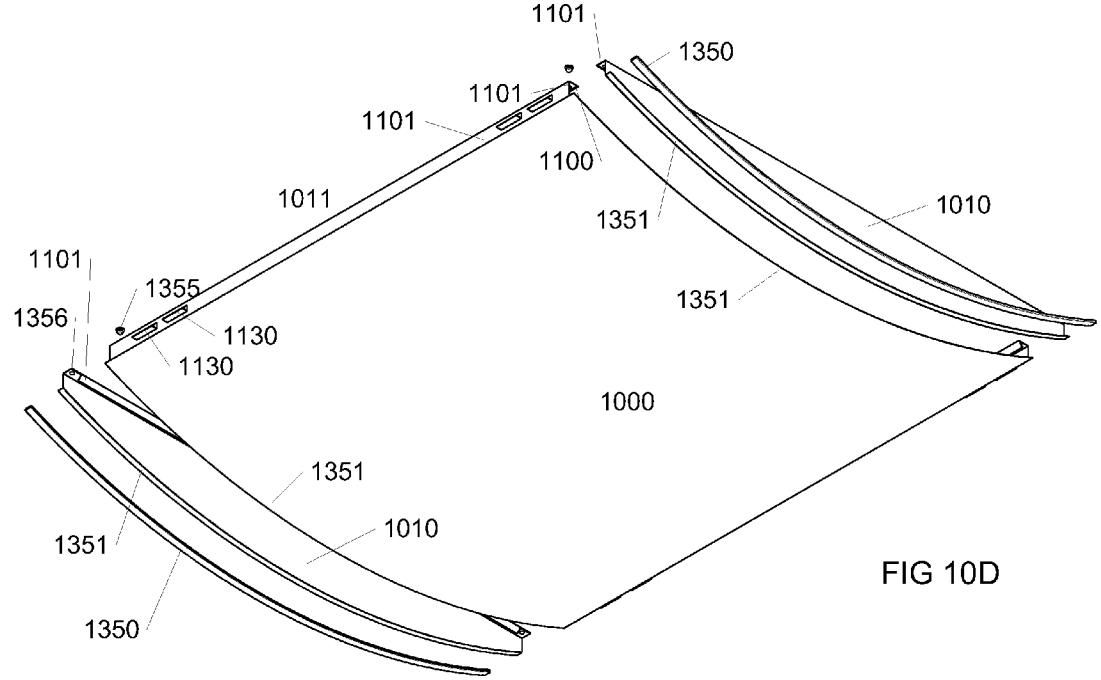
FIG. 10D shows an exploded perspective view of the top side of the example embodiment depicted in FIG. 10B.

Referring to FIGS. 10C and 10D, a curved edge section 1351 of side section 1010 may be inserted into a channel-style semi-rigid extrusion 1350, according to an example implementation. The extrusion 1350, for example, may comprise any semi-rigid molding that may serve to secure edge section 1351 of the side section 1010 to the corresponding edge section 1351 on the curved center section 1011, which may include U-channel, C-channel, clips, spring clips etc. Alternatively, sections 1351 may be fastened together without any external fasteners, and may be glued, sonically welded together, or fastened in any other suitable method that may be cosmetically acceptable to the application. In an example implementation, the curved edge section 1351 of side section 1010 may be inserted into the extrusion 1350, and the extrusion may bend and formed to the curve of the edge section 1351, which may create a suitably rigid frame with the required profile. In certain example implementations, edge sections 1351 from center section 1011 may be inserted into the extrusion channels, and the center section 1011 may bend according to the curvature of the extrusion 1350.

In certain example implementations, overlapping corners of adjacent edge trusses 1101 may be fastened together using plastic rivets 1355 or other suitable fastening devices inserted through holes 1356. Adhesive tape or adhesive may also be utilized to fasten the overlapping corner sections together. Mounting tabs 1130 are shown. Two pairs of mounting tabs per side instead of two mounting tabs per side may give additional attachment force, which may be preferable in some applications.

FIGS. 10A and 10B show perspective views of the assembled example embodiment of frameless lens, which may be suitable to mount in a light fixture as described in other example embodiments. Curved optical film center section 1011 with a lens face 1000 may be securely attached to the optical film side sections 1010 with extrusions 1350. Mounting tabs 1130 on edge trusses 1101 may attach to the interior of a light fixture that may secure the lens to the light fixture as previously described.

Example embodiments need not comprise optical film side panel 1010 as described. In certain example implementations, the side panels may be solid and not configured from optical film. For example, the side panels may be configured from molded plastic, which may contain curved channels to accept the edges from the optical film center section 1011, and may contain features to secure the edge sections 1100 from center section 1011. The solid side panels may also comprise mounting features to mount on a light fixture.

Figure 12A:
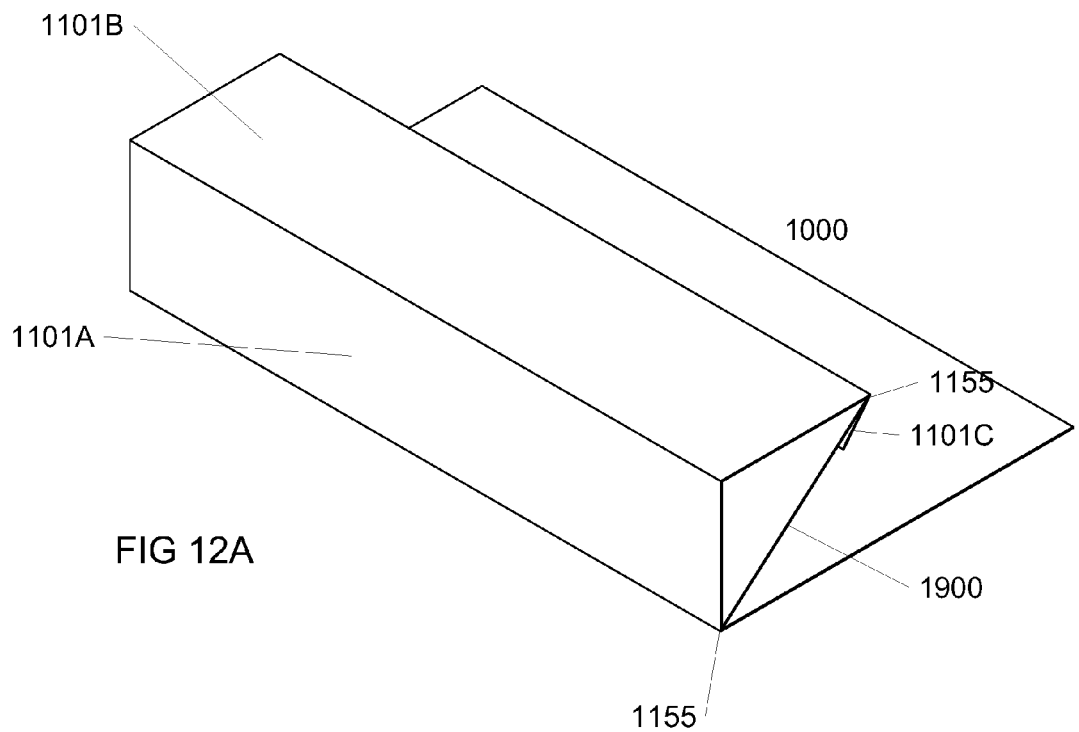
FIG. 12A depicts a perspective view of one edge truss and portion of a lens face, with an edge truss insert nested therein.
Figure 12B:
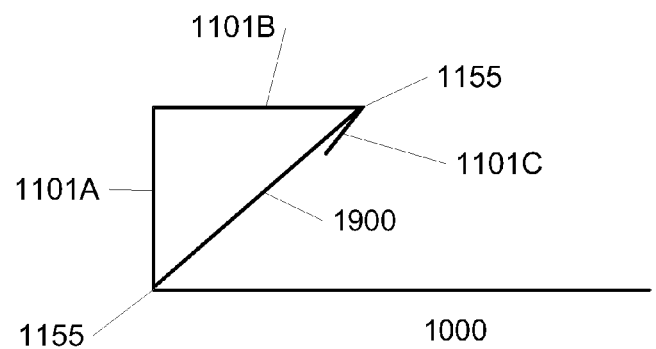
FIG. 12B shows a side cross sectional view of the edge truss and insert depicted in FIG. 12A.

In certain example implementations, an edge truss insert may nest in edge trusses to provide increased light output and increased rigidity, and will now be described with reference to FIG. 12A and FIG. 12B. Referring to FIG. 12A, and according to an example implementation, a small section of a frameless is depicted with a portion of a lens face 1000. This example implementation may include an edge truss with three sides (1101A 1101B 1101C). FIG. 12B shows a cross sectional view of the same embodiment as shown in FIG. 12A. For example, a strip of material, which may form an insert 1900, preferably with good reflection properties and configured to suitable dimensions, may be inserted inside the edge truss, wherein each of the two longer edges of the insert 1900 may be disposed on or near two opposing or adjacent folds 1155 of edge truss sides 1101. In the example embodiment shown, the edge truss may be configured with two approximately square sides (1101A, 1101B) along with a smaller more angled side 1101C. This particular example geometrical configuration of an edge truss may provide certain mounting advantages.

According to certain example implementations, if the edge truss insert 1900 is fabricated from flexible material (such as from reflective optical film as described previously), it may be inserted into the edge truss and manually bent until the longer edges of the insert 1900 are disposed along the folds 1155. In another example implementation, if the reflective inserts are non-flexible, the edge truss sides 1101A, 1101B or 1101C may be bent outwards sufficiently to accept the insert 1900.

In certain example implementations, when mounted on a light fixture, the lip on the light fixture that the frameless lens may be mounted on may be visible through the lens, especially on lenses with low diffusion, which may be partially transparent. The light fixture lip may have holes or slots incorporated into it in order to mount a doorframe, or the lip may be painted black, such as on a recessed light fixture with parabolic louvers. In either case, it may be cosmetically unacceptable for an intended application to have these features visible through the lens. Edge truss inserts as described may function to hide these features from view.

According to an example implementations of the disclosed technology, edge truss inserts, as described, may function to decrease light loss, thereby increasing fixture efficiency. For example, a typical lip on a recessed light fixture may be L shaped, and the irregular surfaces may cause a degree of light loss due to increased multiple reflections. Some lip surfaces may also be painted black, as described with parabolic louvers, which may cause a further degree of light loss due to absorption. According to certain example implementations of the disclosed technology, reflective inserts, as previously described, may be utilized to create a single reflection plane that may cover the L shaped lip surface, and may thereby reduce light loss and increase efficiency. In certain example embodiments, high efficiency reflective material may be utilized (such as optical films previously described) that might have overall reflectance efficiencies of about 97%, and may provide an increased light fixture efficiency.

According to an example implementation of the disclosed technology, edge truss inserts, as described above, may also function to increase the rigidity and strength of edge trusses. Although edge truss configurations as described in example embodiments may be sufficient to allow the frameless lenses to be suspended in a suitably flat configuration, additional edge strength may be required in certain applications. For example, during installation and handling in the field, lenses may undergo a degree of stress and abuse, which could possibly cause them to bend, crease or break etc., especially on lenses with larger spans, such as a 4'×2' lens configuration. In accordance with an example implementation of the disclosed technology, any suitably rigid material may be used to fabricate an edge truss insert. For example, materials such as cardboard, card stock, bristle board, foam core board, plastic etc. may be used for an edge truss insert. In certain embodiments, it may be preferable that the material has good reflection properties in order to minimize light losses as described, and to have an acceptable cosmetic appearance. White card stock, foam core, or similar white paper materials, may have sufficiently acceptable reflection properties for many applications. UV protective coatings on the insert material may be preferable.

The patent application incorporated by reference in the first section of this document contain example embodiments of light fixtures and light fixture retrofits that utilize optical film assemblies that comprise one or more optical films suspended and tensioned on a frame in a substantially flat configuration. It should be noted that example embodiments of frameless optical film lenses described herein could be utilized in place of said optical film assemblies. Accordingly, all example embodiments of light fixtures and light fixture retrofits which may utilize optical film assemblies that comprise one or more optical films suspended and tensioned on a frame from the above mentioned patent applications, may also be deemed to utilize example embodiments of frameless optical film lenses described in this application.

Applications for use of example embodiments of frameless optical film lenses are not restricted to lighting fixtures. Any light emitting apparatus that contains a light source which may require a lens to modify the light from the light source, and which may be of suitable configuration to mount example embodiments of frameless optic film lenses thereon, may comprise a suitable application, for example in displays and light boxes.

According to one implementation of the disclosed technology, there is provided a light modifying element comprising one or more optical film pieces characterized by one or more edge trusses disposed at two or more opposing edges of at least one of the one or more optical film pieces. The one or more edge trusses are characterized by one or more folds of at least a portion of at least one of the one or more optical film pieces. The one or more edge trusses disposed at two or more opposing edges are further characterized to support the one or more optical film pieces in a substantially planar configuration. According to an implementation of the disclosed technology, the one or more optical film pieces are further configured for suspension by at least two edge trusses. According to an implementation of the disclosed technology, the one or more optical film pieces are further configured for suspension by at least a portion of a perimeter surface associated with at least one of the one or more optical film pieces.

According to an implementation of the disclosed technology, the one or more optical film pieces are further characterized by one or more fold lines comprising one or more of score lines, crimp lines or perforated lines. At least a portion of the one or more folds disposed at the two or more opposing edges of the one or more optical film pieces are made along one or more fold lines. According to an implementation of the disclosed technology, the one or more optical film pieces are further configured for attaching to a light emitting device.

According to an implementation of the disclosed technology, the one or more optical film pieces are further configured to lay in a substantially flat configuration when suspended along all, or a portion of a perimeter of the one or more optical film pieces or the edge trusses without requiring film tensioners or a tensioning frame.

According to an implementation of the disclosed technology, the one or more optical film pieces are further characterized by nested optical film pieces.

According to an implementation of the disclosed technology, the light modifying element is further characterized by two or more magnets configured to attach the light modifying element to a light emitting device.

According to an implementation of the disclosed technology, at least a portion of the one or more optical film pieces are configured to nest inside a lens-mounting doorframe of a light fixture.

According to an implementation of the disclosed technology, the one or more edge trusses on the two or more opposing edges of the one or more optical film pieces overlap adjacent edge trusses, and wherein adjacent overlapping edge trusses are configured for fastening to each other.

According to an implementation of the disclosed technology, the one or more edge trusses on two or more opposing edges of the one or more optical film pieces are further characterized by corner tabs, wherein the corner tabs are configured to fasten to adjacent edge trusses.

According to an implementation of the disclosed technology, the one or more optical film pieces are configured with two or more folded tabs, wherein the two or more folded tabs extend outwards from two or more edge trusses. The two or more folded tabs are configured to contact a portion of a light emitting apparatus for attaching the light modifying element to the light emitting apparatus.

According to an implementation of the disclosed technology, the light modifying element is further characterized by two or more mechanical protuberances that protrude through holes in the two or more edge trusses. The two or more mechanical protuberances are configured to contact a portion of a light emitting apparatus for attaching the light modifying element to the light emitting apparatus.

According to an implementation of the disclosed technology, the light modifying element is further characterized by one or more insert strips, the one or more insert strips characterized by a strip of material with two longer sides and two shorter sides. The two longer sides of the one or more insert strips are disposed along, and in proximity to two adjacent or opposing folds on the two or more opposing edges of the one or more optical film sheets. The one or more insert strips are further characterized to impart additional rigidity to the two or more edge trusses.

According to an implementation of the disclosed technology, the light modifying element is further characterized by one or more insert strips, the one or more insert strips characterized by a strip of reflective material with two longer sides and two shorter sides. The two longer sides of the one or more reflective insert strips are disposed along, and in proximity to two adjacent or opposing folds on the two or more opposing edges of the one or more optical film sheets. The one or more insert strips are further characterized to impart additional reflective efficiency to the light modifying element.

According to another implementation of the disclosed technology, there is provided a light modifying element comprising one or more optical film pieces characterized by a substantially curved optical film center section and two side sections. Each of the two side sections include at least one curved edge, wherein two opposing edges of the optical film center section are configured for fastening to the at least one curved edge of each of the side sections. The optical film center section is characterized by one or more edge trusses disposed at two opposing edges of at least one of the one or more optical film pieces. The one or more edge trusses are characterized by one or more folds of at least a portion of at least one of the one or more optical film pieces, and the one or more edge trusses are further configured to support the light modifying element in a substantially planar configuration in at least one direction.

According to an implementation of the disclosed technology, the light modifying element is configured for suspension by at least two edge trusses.

According to an implementation of the disclosed technology, the light modifying element is further configured for suspension by at least a portion of a perimeter surface associated with at least one of the one or more optical film pieces.

According to an implementation of the disclosed technology, the two side sections are comprised of optical film.

According to an implementation of the disclosed technology, the one or more optical film pieces of are further characterized by one or more fold lines comprising one or more of score lines, crimp lines or perforated lines. At least a portion of the one or more folds disposed at the two or more opposing edges of the one or more optical film pieces are made along one or more fold lines.

According to an implementation of the disclosed technology, the one or more optical film pieces are configured to attach to a light emitting device.

According to an implementation of the disclosed technology, the light modifying element further comprises two or more mechanical protuberances configured to protrude through holes in the one or more edge trusses disposed at two or more opposing edges. The two or more mechanical protuberances are configured to contact a portion of a light emitting apparatus for attaching the light modifying element to the light emitting apparatus.

According to an implementation of the disclosed technology, the one or more optical film pieces are further characterized by nested optical film pieces.

An example embodiment of the disclosed technology includes a lens comprising: one or more pieces of optical film configured for attaching to and modifying light from a light emitting device, the one or more pieces of optical film defining: a lens aperture having a lens aperture plane defined by two or more edges of at least a portion of the optical film; a front light-emitting side of the lens; a back light-receiving side of the lens; and two or more edge trusses configured from and corresponding to the two or more edges defining the lens aperture plane, wherein the two or more edge trusses are disposed towards the back light-receiving side of the lens. Each of the two or more edge trusses include one or more sides configured from a corresponding fold in the one or more optical films, wherein at least one of the one or more sides of each of the two or more edge trusses is configured at an angle relative to the lens aperture plane to impart support to the lens and to resist deflection of each edge truss.

In an example embodiment, the lens aperture is disposed in a substantially planar configuration when suspended from four or more points along the two or more edge trusses, or when suspended along all or a portion of a periphery of the front light-emitting side of the lens. In an example implementation, at least one of the one or more sides of the two or more edge trusses is configured at an angle of between +20 degrees and 90 degrees, or between −20 degrees and 90 degrees relative to the lens aperture plane. According to an example implementation, the one or more optical film pieces further comprise one or more of: score lines, crimp lines or perforated lines, wherein at least a portion of folds are created along the one or more of score lines, crimp lines or perforated lines.

In an example embodiment, the light emitting device may be a light fixture, wherein the lens is configured to nest inside a light fixture doorframe that attaches to the light fixture.

In an example embodiment, the two or more edge trusses are further configured to attach to the light emitting device at four or more points.

An example embodiment further includes four or more mechanical protuberances on the two or more edge trusses, wherein each mechanical protuberance is configured to attach to corresponding holes or slots in the light emitting device.

In an example embodiment, at least four tabs are configured on the two or more edge trusses, wherein the tabs extend outwards from each of the two or more edge trusses, and wherein each tab is configured to contact a portion of the light emitting device for attaching the lens to the light emitting device.

An example embodiment further includes one or more insert strips, the one or more insert strips characterized by a strip of material with two longer sides and two shorter sides, wherein the two longer sides of the one or more insert strips are disposed along, and in proximity to two adjacent or opposing folds on two or more opposing edge trusses, wherein the one or more insert strips impart rigidity and or increased reflective efficiency to the two or more opposing edge trusses.

In an example embodiment, the one or more pieces of optical film comprises one or more nested optical film layers covering all or a portion of the lens aperture.

An example embodiment of the disclosed technology includes a light-modifying element for modifying light from a light emitting device. The light-modifying element includes: at least one piece of optical film, the at least one piece of optical film comprising: four edges; a light-emitting front side; and a light-receiving back side; and at least one fold on each of the four edges, wherein each fold defines an edge section at an angle relative to the light-emitting front side, and wherein each of the four edges are disposed towards the light-receiving back side, and wherein each edge section imparts structural support to the light modifying element such that the light modifying element will be disposed in a substantially flat configuration when suspended from four or more points along two or more edge sections, or when suspended along all or a portion of a periphery of the front side of the at least one optical film piece.

In an example embodiment, each edge section borders each corresponding edge of the at least one optical film piece and wherein each edge section is configured at an angle of between +20 degrees and 90 degrees, or between −20 degrees and 90 degrees relative to a plane defined by the light-emitting front side.

In an example embodiment, the at least one optical film piece further comprises two or more folds and two or more corresponding edge sections along two or more edges of the at least one optical film piece.

In an example embodiment, the at least one optical film piece further comprises one or more of: score lines, crimp lines or perforated lines, wherein the folds configured along each edge of the at least one optical film piece are created along the one or more of score lines, crimp lines or perforated lines.

In an example embodiment, the at least one piece of optical film comprises one or more nested optical film layers covering all or a portion of the back of the at least one optical film piece.

An example embodiment of the disclosed technology includes a light fixture. The light fixture includes an enclosure having an aperture; a light source disposed inside the enclosure; and a lens covering all or a portion of the aperture, the lens configured for modifying light from the light source and comprising at least one piece of optical film, the at least one piece of optical film comprising: four edges; a light-emitting front side; a light-receiving back side; and at least one fold configured along each of the four edges, wherein each fold creates an edge section at an angle relative to the light-emitting front side, and wherein each edge section is disposed towards the light-receiving back, and wherein each edge section imparts structural support to the light modifying element such that the light modifying element will be disposed in a substantially flat configuration when suspended from four or more points along two or more edge sections, or when suspended along all or a portion of a periphery of the light-emitting front side.

In an example embodiment, the lens is suspended along the periphery of light-emitting front side in a doorframe attached to the light fixture.

In an example embodiment, the lens is suspended in the light fixture from four or more points along two or more edge sections.

In an example embodiment, the at least one piece of optical film further comprises one or more of: score lines, crimp lines or perforated lines, wherein at least a portion of folds are created along the one or more of score lines, crimp lines or perforated lines.

In an example embodiment, the at least one piece of optical film further comprises two or more folds and two or more corresponding edge sections along two or more edges of the at least one optical film piece.

In an example embodiment, the edge section bordering each edge of the at least one piece of optical film is configured at an angle of between +20 degrees and 90 degrees, or between −20 degrees and 90 degrees relative to a plane defined by the a light-emitting front side An example embodiment of the disclosed technology includes a light fixture. The light fixture includes an enclosure with an aperture; a light source disposed inside the enclosure; and one or more lenses covering all or a portion of the aperture, the one or more lenses configured for modifying light from the light source, and comprising at least one piece of optical film with a thickness of under 325 um, wherein the at least one piece of optical film is disposed in a substantially planar configuration without mechanical tensioners or a supporting substrate.

With the advent of low cost energy saving LED technology, there may be a large market for retrofitting LED light sources into commercial linear fluorescent light fixtures. Examples of commercial linear fluorescent light fixture may include fluorescent troffer light fixtures with parabolic louvers. Such fixtures used to be very popular, and are one of the most common commercial light fixtures installed across the USA. Unfortunately, in addition to low efficiency and non-ideal light output distribution, the light source can be directly visible through the louvers and may cause such fixtures to be no longer popular or desirable. As previously described, it may be desirable to retrofit linear fluorescent fixtures with LED tubes and LED strips as an alternative to fixture replacement. Parabolic troffers have no lens, so when they are retrofitted with LED strips, the harsh direct light from the LEDs may be visible, perhaps making this a very poor retrofit option. LED tubes with a frosted lens may be a better option, but they still may create thin strips of very bright light that does little to make a visually acceptable option.

An example embodiment of lens assembly may now be described that may overcome these inherent disadvantages, as well as provide the advantages of a low cost, easy to install lens system that may be utilized as a retrofit lens assembly to attach to a light fixture either as a retrofit, or as original equipment on a new light fixture.

Figure 13A:
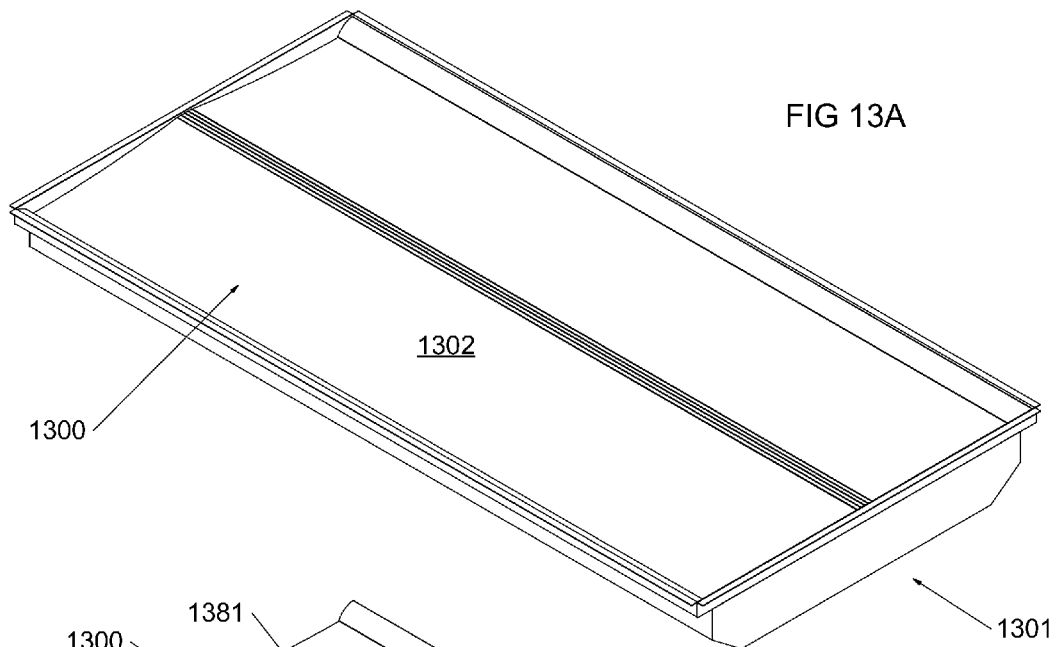
FIG. 13A shows a perspective view of the front light-emitting side of a troffer light fixture with an example embodiment of suspended optical film lens assembly attached thereto.

FIG. 13A depicts a perspective view of a troffer light fixture enclosure 1301 retrofitted with an example embodiment of a suspended optical film lens assembly 1300 attached to the enclosure 1301. In certain example implementations, the optical film lens assembly 1300 includes a lens 1302. FIG.

Figure 13B:
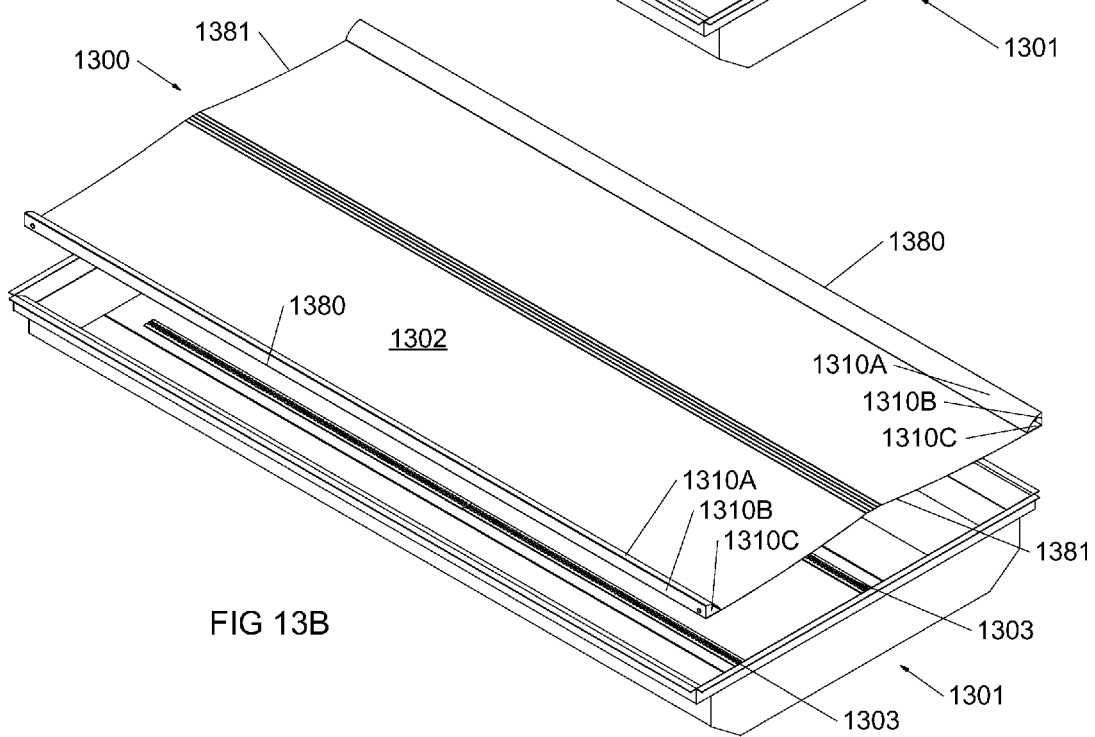
FIG. 13B shows an exploded perspective view of the front light-emitting side of a troffer light fixture with an example embodiment of suspended optical film lens assembly attached thereto as shown in FIG. 13A.

13B depicts an exploded perspective view of the enclosure 1301 and lens assembly 1300, having two linear LED arrays 1303 retrofitted inside the enclosure 1301. In an example implementation, the lens 1302 may be configured from a single piece of optical film. In other example implementations, two or more pieces of optical film may be utilized for the lens 1302. In an example implementation as shown in FIG. 13B, the optical film lens assembly 1300 may comprise two support edges 1380 and two unsupported edges 1381, wherein the two unsupported edges 1381 may be suspended between the support edges 1380 when the lens assembly 1300 is installed in a light fixture enclosure 1301. In an example embodiment, the support edges may comprise edge trusses with one or more edge truss sides. The edge trusses may be configured along folds in the optical film as previously described. In an example embodiment, each supporting edge truss may comprise three edge truss sides 1310A, 1310B and 1310C that may form a hollow structure. A hollow elongated structure, and in particular, a triangular hollow tube, may provide exemplary rigidity and support to each support edge 1380. Both edge trusses or portions of the optical film piece 1302 adjacent to the support edges 1380 may attach to opposing edges of the aperture of the light fixture enclosure 1301 wherein the portion of the optical film piece 1302 between the support edges 1380 may define a lens aperture, and may become suspended between the support edges 1380.

FIG. 14A depicts a back (light-receiving side) perspective exploded view of an example embodiment of lens assembly (for example, the lens assembly 1300 as shown in FIG. 13A and FIG. 13B). FIG. 14B depicts a front (light-emitting side) perspective view of the same (for example, the lens assembly 1300 as shown in FIG. 13A and FIG. 13B). In an example implementation, the optical film lens 1402 may comprise a single piece of optical film configured with two support edges 1480 and two unsupported edges 1481. The optical film piece 1402 may comprise any type of optical film or any optical film previously described herein. In an example implementation, magnets 1404 may attach to the lens 1402 with fasteners 1405. In certain example implementations, the magnets 1404 may attach to the lens 1402 with fasteners 1405 through corresponding holes in the optical film lens 1402. According to an example implementation of the disclosed technology, folds or crimp lines 1411 (as depicted in FIG. 14B) may be created in the optical film piece of the lens 1402 to create a flat center section 1418 as shown. This may create a visually appealing look, and the two folds may function to increase the rigidity, stability and correct alignment of the suspended portion of the lens 1402.

FIG. 14C depicts a side cut-away view of a troffer light fixture. In an example implementation, the lens assembly may be inserted into a light fixture enclosure 1401, wherein the lens assembly may be disposed as shown. Since the great majority of troffer light fixtures may be fabricated from steel, the magnets 1404 may function to attach corresponding mating surfaces together. In an example implementation, the vertical surface of each magnet 1404 may be disposed in close proximity to the vertical enclosure surfaces 1421. Due to the magnetic attraction between the magnets 1404 and the vertical enclosure surfaces 1421, both opposing edge trusses may be attached to the corresponding enclosure surfaces 1421, thereby evenly suspending and tensioning the optical film lens 1401 over the aperture of the light fixture enclosure. In an example implementation, the bottom edge of each magnet 1404 may also contact the corresponding horizontal surfaces 1420, thereby further securing the lens assembly to the light fixture against the pull of gravity. In certain example implementations, magnets may be attached to the suspended optical film lens assembly in any positions that may function to securely hold the lens assembly to a light fixture. For example, the magnets 1404 may attach to an edge truss side 1310C as shown in FIG. 13B, and mate and attach to surface 1420 of the enclosure 1401 in FIG. 14C. Since this magnet-mounting configuration may not pull the edge trusses towards surface 1421 of the enclosure 1401, this configuration may have the advantage of being able to be manually adjusted and aligned in the enclosure mounting channels after being installed. Since different brands of light fixtures may have slightly different dimensions, and many fixtures may be bent, damaged or may have opposing mounting channels out of alignment, this magnet mounting configuration make be able to compensate for these variations.

The related application U.S. patent application Ser. No. 14/254,960, entitled "Light Fixtures and Multi-Plane Light Modifying Elements," filed Apr. 17, 2014, describes example embodiments of refraction features on lenses that may function to create increased aesthetic appeal of a lens, as well as increase lamp hiding and blending of shadowed areas on a lens surface. Referring to FIG. 14B, refraction features 1406 may be configured on either surface of the lens 1402, and may be created utilizing any method previously described. In certain example implementations, the refraction features 1406 may function to create increased visual appeal of the example embodiment of lens assembly.

Figure 15A:
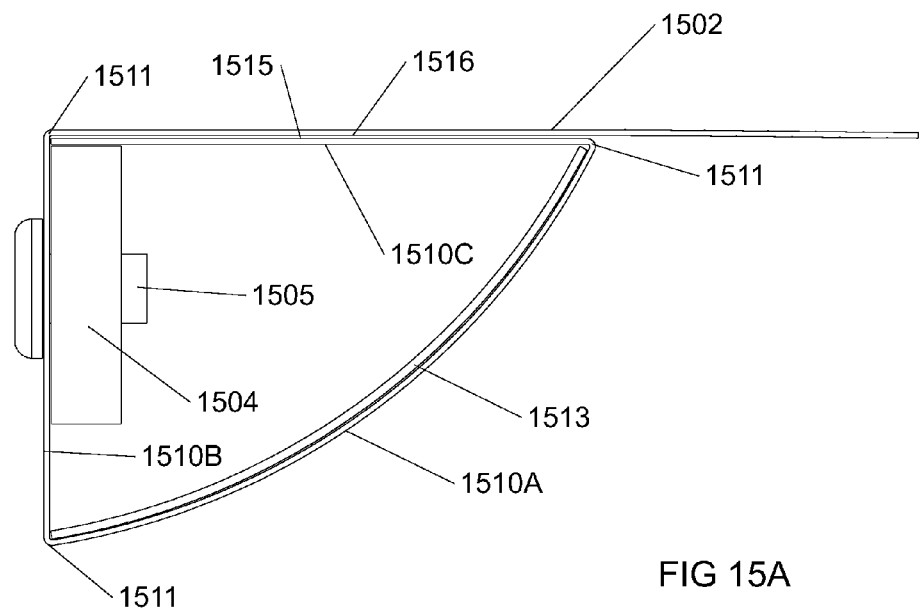
FIG. 15A shows a close-up cutaway side view of one edge of an example embodiment of suspended optical film lens assembly.

FIG. 15A depicts a close-up side view of one edge of the lens assembly shown in FIGS. 14A and 14B. In certain example implementations, three-sided edge trusses may be configured in the optical film of the lens 1502. For example, edge truss sides 1510A, 1510B and 1510C may be configured along corresponding folds 1511 in the optical film of the lens 1502, wherein said folds may be configured in any manner as previously described. For example, folds may be created along any of one or more of score lines, crimp lines and perforated lines. In certain implementations, the folds may be created by machinery that may fold the film without first creating a score line, crimp line or perforated line. In an example implementation, the surface 1515 of the edge truss side 1510C may contact a portion of the film surface 1516 when the edge truss is configured as described and depicted in FIG. 15A. In certain example implementations, an adhesive may be applied to either surface 1515 or 1516, or both surfaces, thereby attaching surface 1515 and surface 1516 together and securing the three-sided edge truss in its final configuration. The amount of curvature of the curved edge truss side 1510A may be configured by increasing or decreasing the distance between the corresponding folds 1511 on either side of the edge truss side 1510A. In an example implementation, the edge truss side 1510 may be configured flat. In another example implementation, the edge truss side 1510A may be configured concave.

In an example implementation, an insert 1513, as shown in FIG. 15A, may comprise any visually suitable material that may be inserted into, and be disposed inside the edge truss as shown. The insert 1513 may function to render the edge truss opaque when viewed from the front light-emitting side of the lens in order to hide the fasteners, adhesive and light fixture enclosure surfaces from view that may be visible through the optical film. The insert 1513 may also function to give the edge trusses increased visual appeal, and may have the appearance of a metal frame when viewed installed in a ceiling. For example, insert 1513 may be fabricated from white reflective film, paper, plastic etc.

Again referring to FIG. 15A, magnets 1504 may be attached with fasteners 1505 through holes configured in the optical film lens 1502. The fasteners 1505 may comprise any suitable fastener such as rivets or screws for example. In an example embodiment, magnets may be attached to the optical film with adhesive.

In an example embodiment, magnets may be adhered to strips of adhesive tape as shown in FIG. 17A through FIG. 17D. FIG. 17A shows a perspective view, FIG. 17B shows a side view, FIG. 17C shows a perspective exploded view, and FIG. 17D shows an alternate perspective exploded view of a cutaway corner section of an example embodiment of suspended optical film lens similar to that shown in FIG. 15A. Adhesive tape strip 1760 may comprise any suitable adhesive tape. In an example embodiment, the adhesive tape may have a high coefficient of friction such as anti-slip grit tape, or tape comprising soft silicone, which may function to prevent or minimize lateral sliding of an example embodiment of lens assembly on a mounting surface of a light fixture. Lateral sliding may occur due to lateral tension in the optical film between each corresponding support edge, or vibrations of a light fixture it may be mounted on, wherein the magnets utilized have insufficient pulling force to prevent these forces from causing lateral sliding. Magnets 1704 may be stuck on the adhesive side of the tape strips 1760, and tape strip/magnet assembly may subsequently be adhered to the optical film 1702, wherein the magnets protrude through corresponding holes in the optical film 1702 and edge truss sides (not shown) of edge trusses 1710. This method of magnet mounting may have an advantage wherein after mounting in a light fixture, the magnets may be disposed at a distance from the light fixture mounting surface equal to the thickness of the tape strips 1760. Since magnetic force may decrease somewhat logarithmically with the increase in distance between the mating surfaces, tape strips with relatively thin profiles may be advantageous. Close mating distances may allow the use of lower power magnets than would otherwise be able to.

Example embodiments of suspended optical film lens assemblies may utilize any other suitable means of attachment to a light fixture other than magnets, which for example may include: hook and loop fasteners, fasteners such as screws, rivets, clips etc., adhesives etc.

Figure 15B:
FIG. 15B shows a side view of an example embodiment of suspended optical film lens assembly with a curved lens profile.
Figure 15C:
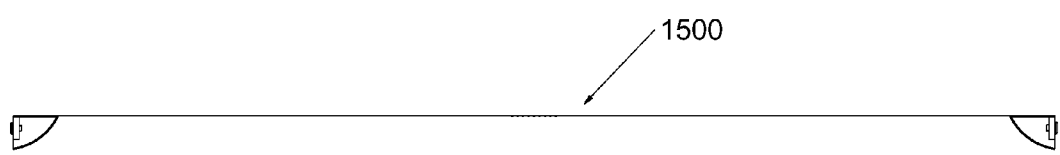
FIG. 15C shows a side view of an example embodiment of suspended optical film lens assembly with a substantially flat lens profile.

Various configurations of lens profiles may be utilized in example embodiments of suspended optical film lens assemblies that may be optically or visually acceptable for a given application. For example, FIG. 15B depicts a curved profile lens assembly 1500, and FIG. 15C depicts a lens assembly 1500 with a substantially flat lens profile. The related U.S. patent application Ser. No. 14/267,940 entitled "OPTICAL FILM COMPRESSION LENSES, OVERLAYS, AND ASSEMBLIES" describes various example embodiments of compression lenses wherein different optical film lens profile shapes may be created by utilizing various combinations of inward and outward folds in an optical film piece. Although example embodiments of suspended optical film lens assemblies may be laterally stretched rather than compressed in channels as example embodiments of compression lenses may be, similar folding techniques utilized in said related application may be utilized on example embodiments of suspended optical film lenses in order to achieve a wide variety of lens profile shapes.

Example embodiments of suspended optical film lens assemblies may have been described as utilizing a single piece of optical film with edge trusses configured on two opposing edges of the film, wherein the edge trusses may function as frame members that may attach to a light fixture, and that may function to act as supports to suspend an optical film piece between. However, in other example embodiments, separate frame members may be utilized in place of edge trusses configured into an optical film piece. For example, in certain example implementations, a frame member may comprise an elongated structure with a profile comprising a square, rectangular or triangular shape. In other example implementations, a frame member may comprise a metal such as extruded aluminum. A frame member may comprise a plastic, such as an extruded plastic tube for example. A frame member may be fabricated from optical film folded into a closed profile shape such as those described for example. An optical film piece may be attached to a frame member with an adhesive or any suitable kind of fastener such as rivets, screws, clips etc.

An optical piece may be attached to a frame member utilizing a substrate attachment system as taught in the related U.S. patent application Ser. No. 14/490,188 entitled "Light Fixtures and Multi-plane Light Modifying Elements" filed Sep. 18, 2014, and incorporated herein by reference. As disclosed, a substrate may comprise a single edge truss, wherein the edge truss may be inserted into a frame member comprising an edge truss retention feature that may secure the edge truss within the frame member. Accordingly, in an example embodiment of suspended optical film assembly, the two major edges of the optical film piece may comprise one-sided edge trusses, and the elongated frame members may comprise edge truss retention features that may lock the major edges within the elongated frame members. This attachment method may have the advantage of lower assembly time and cost.

Figure 16A:
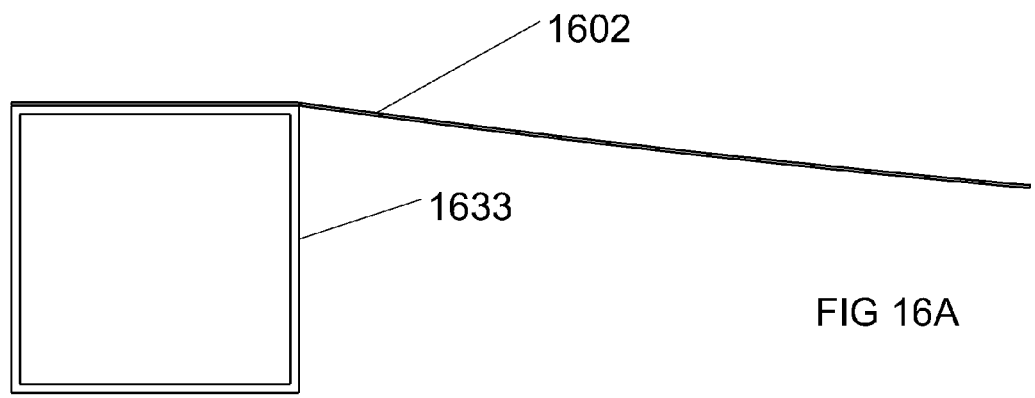
FIG. 16A shows a side view of one edge of an example embodiment of suspended optical film lens assembly wherein an edge of an optical film piece with no edge trusses attaches to a separate frame member.
Figure 16B:
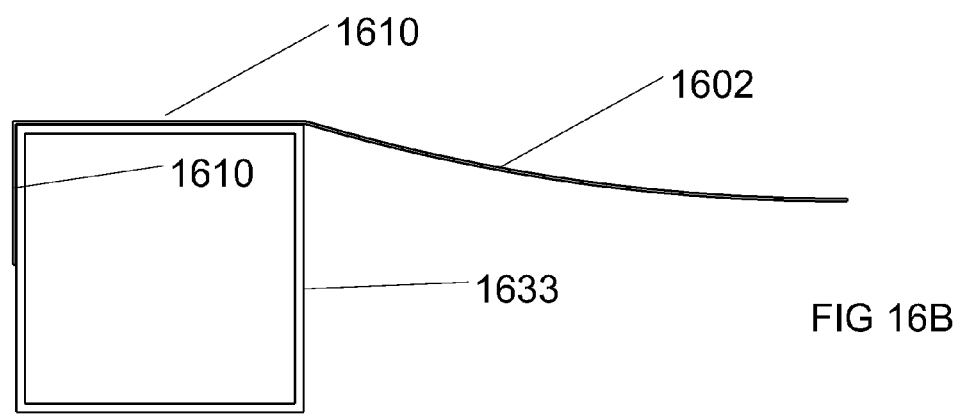
FIG. 16B shows a side view of one edge of an example embodiment of suspended optical film lens assembly wherein an edge of an optical film piece with one two edge trusses attaches to a separate frame member.
Figure 16C:
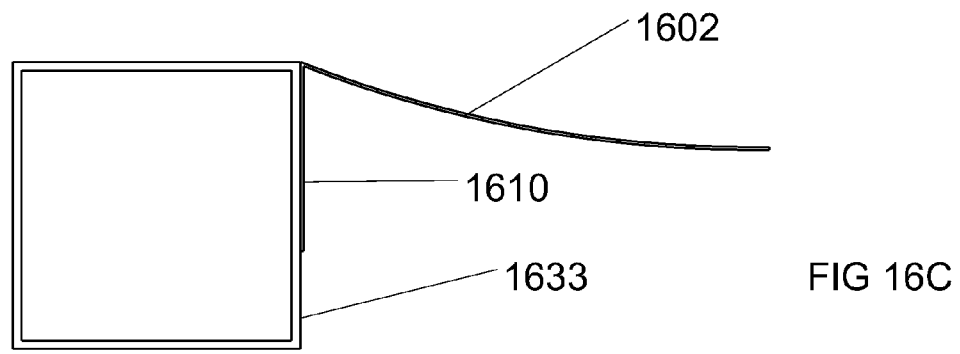
FIG. 16C shows a side view of one edge of an example embodiment of suspended optical film lens assembly wherein an edge of an optical film piece with one edge truss attaches to a separate frame member.

In certain example implementations, an optical film piece of a lens 1602 that does not include any edge trusses may be attached directly to a frame member 1633 utilizing methods as previously described, and as shown in FIG. 16A. In another example implementation, an optical film piece of a lens 1602 with one or more edge trusses 1610 may be attached directly to a frame member 1633 utilizing methods as previously described, and as shown in FIG. 16B and FIG. 16C. Any configuration of edge trusses and mounting configurations of an optical film piece to a frame member may be utilized that may meet the required mechanical and visual requirements of a given application. Frame members may attach to a light fixture by any attachment means previously described for edge trusses.

In an example embodiment, a lens assembly with an integral LED light engine may be provided that may be suitable for attachment to a light fixture, and may provide advantages that include one or more of low cost, easy installation, and creating a well diffused light source from a single linear LED array. In an example embodiment, an LED heat sink may be provided that comprises lens assembly mounting features along with recessed fins that may have the advantages of good thermal efficiency along with a more visually appealing look. Example embodiments may be highly advantageous in many lighting applications, for example, retrofit applications where linear fluorescent fixtures are being converted to LEDs.

In an example embodiment, FIG. 18A shows a light fixture enclosure 1801 which may comprise any suitable light fixture enclosure, such as a troffer light fixture as previously described, along with an installed example embodiment of lens assembly comprising two lens sections 1802 and example embodiment of heat sink assembly 1857. FIG. 18B shows an exploded side view of the same. Referring to FIG. 18B, in an example embodiment, an LED driver 1859 (a simplified drawing thereof) along with its associated input and output wiring (not shown) may be mounted in the center portion of the inner surface of the enclosure 1801. In an example embodiment, a wiring cover 1856 that may be fabricated from any suitable safety code approved material, may be placed over top of the driver assembly and attached to the enclosure utilizing any suitable fastening means, such as self-tapping screws for example. A wiring cover with a curved profile as shown may be preferable for even light distribution, as may be described later.

In an example embodiment, a sheet of reflection film 1855 that has been sized to the appropriate dimensions for the enclosure 1801 may be inserted into the enclosure and form fitted over the contour of the inside surface of the enclosure 1801, and secured with small magnets 1804B. Other fastening methods may be utilized as well, such as screws, rivets, adhesives etc. for example.

Figure 19A:
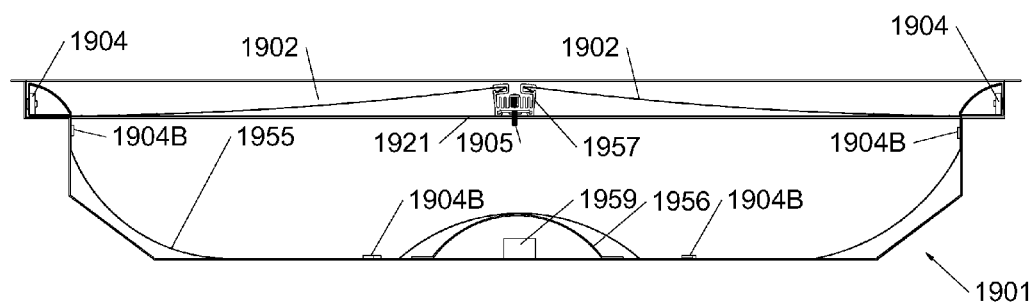
FIG. 19A shows an un-exploded side cut-away view of the troffer light fixture with an example embodiment of light reflector and example embodiment of lens assembly with integral LED light engine attached as shown in FIG. 18B.

FIG. 19A depicts an example implementation of a reflection sheet 1955 attached to an enclosure 1901 with magnets 1904B. FIG. 19A shows a side cutaway view of the enclosure shown in FIG. 18B. In an example embodiment, the reflection sheet 1955 may comprise any film or substrate that has suitable reflection and flexibility characteristics. Due to the harsh point-source lighting characteristics of LED light sources, a film or substrate with diffuse reflection characteristics may be preferable. According to an example embodiment of the disclosed technology, the reflection sheet may include a material that has high overall reflectivity, with efficiency preferably over 95%. The reflection material for example, may also provide a diffuse reflectance of over 95%. Example materials that may provide such characteristics include foamed microcellular PET plastic sheets. Such example materials may be obtained from Kimoto Tech Inc. and include products such as the REF-WHITE series of reflector film.

According to an example embodiment, and as shown in FIG. 18A and FIG. 18B, a lens assembly may include an elongated heat sink 1857, a linear LED array 1803 and two mounting screws 1805. The heat sink 1857 may include integral lens attachment features 1861 disposed on opposing sides of the heat sink 1857. A related U.S. patent application Ser. No. 14/480,188 filed Sep. 18, 2014 entitled "Light Fixtures and Multi-Plane Light Modifying Elements," may describe example embodiments of substrate attachment systems. In an example embodiment, a substrate attachment system may comprise a substrate having a first surface configured with at least one supporting edge truss configured from a corresponding fold in the substrate. The fold may be adjacent to a least one edge of the substrate, wherein the at least one supporting edge truss may be configured at an angle relative to the first surface, and wherein the at least one supporting edge truss may include an outer perimeter edge. The example embodiment of a substrate attachment system may further comprise at least one elongated frame member with a cross section comprising at least two segments, wherein the at least two segments may define at least a first surface and an adjacent second surface. The adjacent second surface may further comprise an edge truss retention feature. The substrate may be capable of being attached to the at least one elongated frame member such that the first surface of the substrate may be disposed on the first surface of the at least two frame segments, and the outer perimeter edge of the edge truss may be engaged by the edge truss retention feature on the adjacent second surface of the at least two frame segments.

Figure 19B:
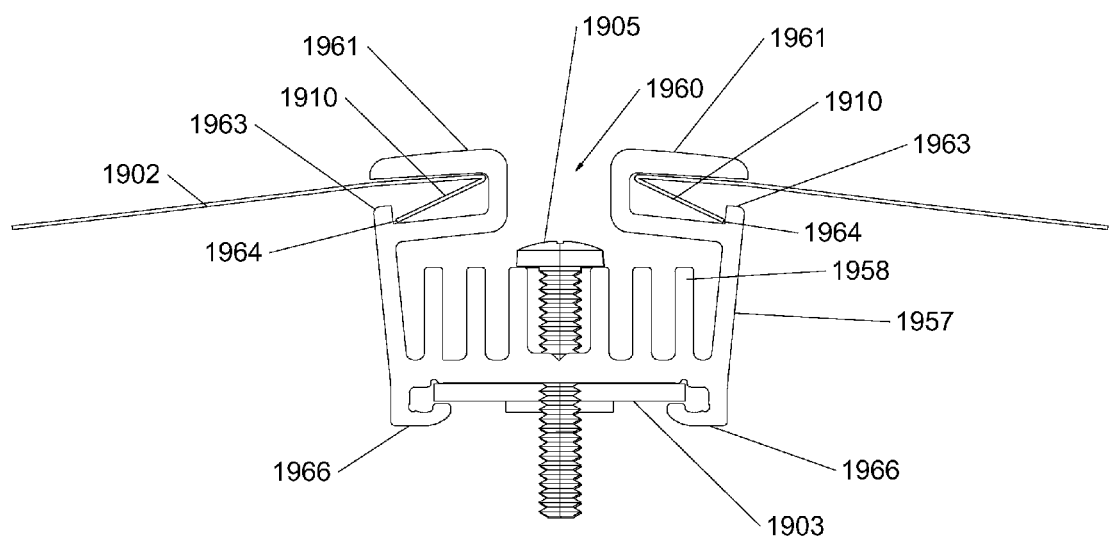
FIG. 19B shows a close-up cut-away side view of the LED light engine shown in FIG. 18A, FIG. 18B, and FIG. 19A.

In an example embodiment, FIG. 19B shows a close-up cut-away view of the heat sink assembly as shown in FIG. 18A, FIG. 18B and FIG. 19A, with heat sink 1957, LED array 1903, screws 1905, and lens sections 1902. In an example embodiment, each lens section 1902 may comprise a support edge that may comprise an edge truss 1910, wherein the edge trusses may insert into lens attachment features 1961 such that a perimeter edge 1964 of each edge truss 1910 may become engaged against edge truss retention features 1964, and therein securing each lens section 1902 to heat sink 1957.

In an example embodiment, lens sections may not comprise an edge truss on the support edge of the optical film piece that attaches to a heat sink. In an example embodiment, the corresponding support edges may attach to lens mounting features, grooves, slots etc. on a heat sink, utilizing fasteners, clips, adhesives, hook and loop fasteners etc. In other example embodiments, edge trusses with one or more sides may slide into channels on a heat sink that may slidingly accept and secure the edge truss to the heat sink.

Referring again to FIG. 18B, in an example embodiment, a lens sections 1802 may also comprise outer support edges 1880 configured to attach in proximity to two opposing edges of a light fixture aperture. In an example embodiment, outer support edges may comprise any configuration previously described herein. In an example embodiment, the outer support edges 1880 may be configured as shown with three edge truss sides forming a hollow elongated structure (such as a hollow tube), and may be substantially similar to that shown in FIG. 15A. In an example embodiment, the support edges 1880 may be configured similar to example embodiments shown in FIG. 16A, FIG. 16B, and FIG. 16C, wherein the support edges of the lens sections 1802 may attach to elongated support members. In example embodiments, the support edges 1880 may attach to a light fixture in any manner previously described.

Referring to FIG. 19B, in an example embodiment, the heat sink 1957 may comprise fins 1958 that may function to radiate heat created by an LED array 1903. Increased thermal efficiency of a light fixture LED heat sink may be higher if the heat sink is directly exposed to air from the room the light fixture may be mounted in, rather than being disposed inside an enclosed light fixture enclosure that may be covered by a lens. However, typical heat sink configurations with fins may not be visually pleasing. In an example embodiment, lens attachment features 1961 may function to recess the fins 1958 while still allowing air movement across the fins, wherein the fins may be substantially less visible, and therefore more visually pleasing.

In an example embodiment, the heat sink assembly may be mounted to a light fixture, wherein the surfaces 1966 may contact a horizontal lens-mounting surface (similar to surfaces 1420 in FIG. 14C) on two opposing aperture edges of a light fixture. In an example embodiment, a screw 1905, for example a self-tapping screw, may be utilized on both ends of the heat sink to secure the heat sink surfaces 1966 against the horizontal lens-mounting surfaces of a light fixture. In an example embodiment as shown in FIG. 19A, the screws 1905 may protrude through the heat sink 1957 and horizontal lens-mounting channels 1921. In other example embodiments, other methods of fastening the heat sink to light fixture may also be utilized, such as rivets, clips, mating fasteners, hook and loop fasteners etc.

Figure 20:
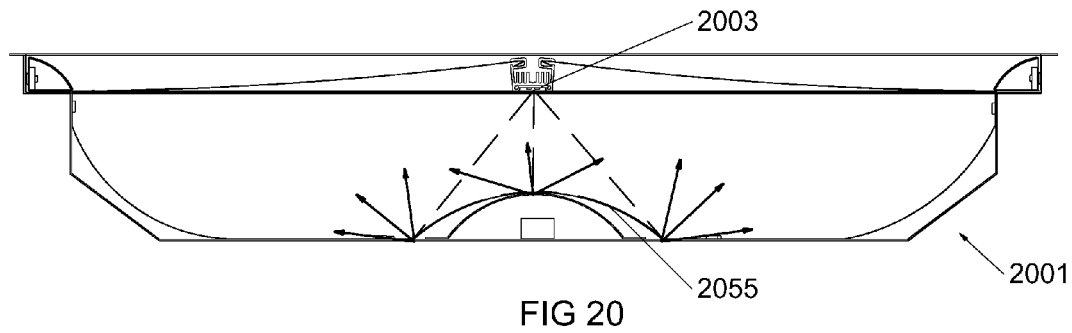
FIG. 20 shows a side cut-away view diagram of light propagation in a troffer light fixture that utilizes an example embodiment of lens assembly with integral LED light engine, along with an example embodiment of light reflector.

In an example embodiment as shown in FIG. 20, after installation in a light fixture enclosure 2001, the LED array 2003 may direct light towards the central curved portion of the reflection surface 2055 as represented by example incident light rays with the dashed lines. In an example embodiment, the curvature and the diffuse reflectance properties of the reflection surface 2055 may function to reflect light in a relatively even distribution pattern inside the light fixture enclosure 2001 as shown by the example reflected light rays represented by the arrows. This may allow a single linear LED array 2003 to distribute light relatively evenly throughout an entire light fixture enclosure.

In an example embodiment, a heat sink may be configured for two or more linear LED arrays that may be mounted beside, and parallel to each other. In other example embodiments, two or more LEDs mounted side-by-side and parallel to each other may also have their light emitting faces disposed at an angle relative to each other, that may increase the light distribution within a light fixture.

Figure 21A:
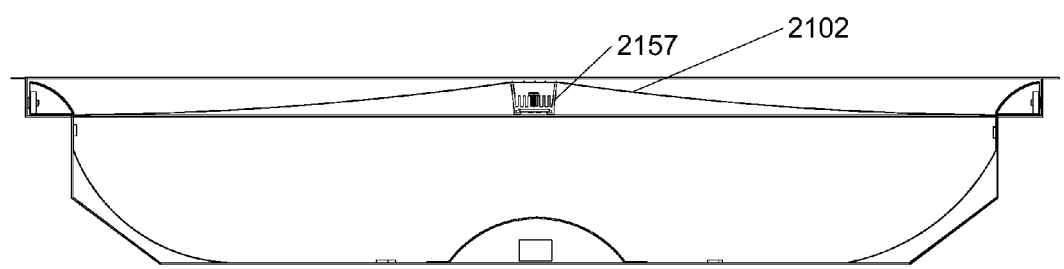
FIG. 21A shows a side cut-away view of an example embodiment of lens assembly, LED light engine and light reflector attached to a troffer light fixture, wherein the lens is continuous in the center region and does not attach to the light engine.
Figure 21B:
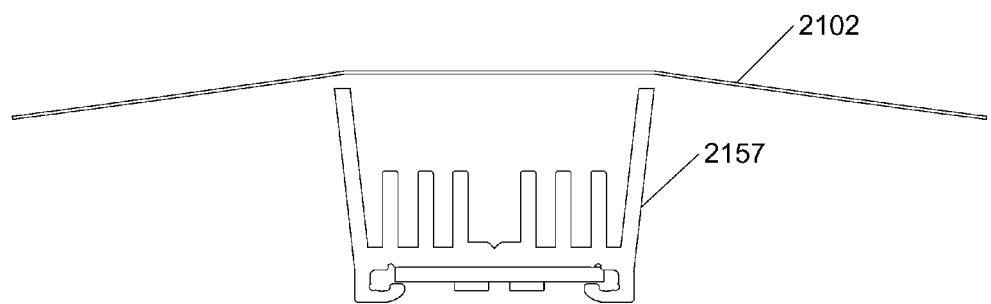
FIG. 21B shows a close-up cut-away view of the example embodiment of lens assembly and LED light engine as shown in FIG. 21A.

In an example embodiment, a standalone lens assembly similar to that shown in FIG. 14A and FIG. 14B may be used with an alternate example embodiment of heat sink as shown in FIG. 21A and FIG. 21B, wherein the lens may be continuous and not attach to the heat sink. FIG. 21A and FIG. 21B show a side cut-away views of an example embodiment. The lens assembly 2102 may be substantially similar to any example embodiment of lens assembly shown and described from FIG. 13A through FIG. 17D, wherein the lens assemblies may not be configured for any attachment in their central sections. FIG. 21B shows a close-up cut-away view of the heat sink 2157 and lens assembly 2102 from FIG. 21A. Although the heat sink may be disposed beneath the lens assembly 2102 in an enclosed light fixture environment wherein thermal efficiency of the heat sink may be diminished compared to an open-air example embodiment previously described, it may nevertheless provide sufficient thermal efficiency for many applications.

In an example embodiment of the disclosed technology, a lens apparatus may comprise at least one piece of optical film configured for modifying light. The at least one piece of optical film may comprise a front light-emitting side, a back light-receiving side, two or more major edges and four corner regions. One or more of a score line, perforated line and crimp line may be configured into the at least one piece of optical film adjacent to at least a portion of at least the two or more major edges. Edge trusses may be configured along all or a substantial portion of the at least two major edges of the at least one piece of optical film, wherein each edge truss comprises one or more edge truss sides configured from folds in the at least one piece of optical film along the one or more of score lines, perforated lines and crimp lines. At least one edge truss side of each edge truss may be configured at an angle relative to the front light-emitting side of the at least one piece of optical film. Each edge truss may be configured to impart support to the lens apparatus and to resist deflection of the lens apparatus to enable the lens apparatus to be disposed in a substantially flat configuration without tensioners or tensioning from an external frame when suspended along all, or a portion of the periphery of the front light-emitting side of the optical film piece, or suspended from four or more points on two or more edge trusses.

In an example embodiment, at least one edge truss side of each of the at least two edge trusses may be configured at an angle of between +20 degrees and 90 degrees, or between −20 degrees and 90 degrees relative to the front light-emitting side of the lens.

In an example embodiment, the lens apparatus may further comprise at least two of one or more of a score line, perforated line and crimp line adjacent to at least a portion of the at least two major edges of the at least one piece of optical film, wherein the edge trusses on the at least two major edges of the piece of optical film may be configured from folds along the two one or more of score lines, perforated lines and crimp lines.

In an example embodiment, the lens apparatus may further comprise at least three of one or more of a score line, perforated line and crimp line adjacent to at least a portion of the at least two major edges of the at least one piece of optical film, wherein the edge trusses on the at least two major edges of the piece of optical film may be configured from folds along the three one or more of score lines, perforated lines and crimp lines.

In an example embodiment, the lens apparatus may further comprise corner cuts defined by one or more cuts through the piece of optical film that extend across a corner region, wherein the section of the optical film piece abutting the one or more cuts in the optical film may be removed.

In an example embodiment, the lens apparatus may further comprise one or more nested optical film layers.

In an example embodiment, the lens apparatus may further comprise a light fixture enclosure comprising an aperture, wherein the at least one piece of optical film may be capable of mounting on the light fixture and covering a portion of the aperture.

In an example embodiment of the disclosed technology, a lens apparatus may comprise at least one piece of optical film configured for modifying light. The at least one piece of optical film may comprise two or more major edges, a front light-emitting side, a back light-receiving side and four corner regions, each having one or more associated minor edges defining one or more corner cuts that define a corner cutout. The lens apparatus may also comprise an edge truss configured on the two or more major edges, wherein each edge truss may be disposed towards the back light-receiving side of the at least one piece of optical film. Each edge truss may comprise one or more sides configured from a corresponding fold in the at least one piece of optical film, wherein at least one of the one or more sides of each edge truss may be configured at an angle relative to the front light-emitting side of the at least one piece of optical film to impart support to the lens apparatus and to resist deflection of each edge truss.

In an example embodiment, the front light-emitting side of the at least one piece of optical film may be disposed in a substantially planar configuration when suspended from four or more points along the edge trusses, or when suspended along all or a portion of a periphery of the front light-emitting side of the at least one piece of optical film.

In an example embodiment, at least one edge truss side of each of the two or more edge trusses may be configured at an angle of between +20 degrees and 90 degrees, or between −20 degrees and 90 degrees relative to the front light-emitting side of the at least one piece of optical film.

In an example embodiment, the at least one piece of optical film may further comprise one or more of: score lines, crimp lines or perforated lines, wherein at least a portion of the folds may be created along the one or more of score lines, crimp lines or perforated lines.

In an example embodiment, the lens apparatus may be configured to nest inside a light fixture doorframe that attaches to a light fixture.

In an example embodiment, the at least one piece of optical film of the lens apparatus may comprise one or more nested optical film layers.

In an example embodiment, the lens apparatus may further comprise a light fixture enclosure comprising an aperture, wherein the at least one piece of optical film may be capable of mounting on the light fixture and covering a portion of the aperture.

In an example embodiment of the disclosed technology, a lens apparatus may comprise at least one piece of optical film that may comprise two opposing support edges, wherein an area between the two opposing support edges may define a lens plane. Each opposing support edge may comprise an edge truss configured along all, or a substantial portion of a corresponding support edge of each opposing support edge, wherein each edge truss may comprise one or more edge truss sides configured from folds in the at least one piece of optical film. The lens apparatus may also comprise two opposing unsupported edges that may be configured to be suspended between the two opposing support edges. The at least one piece of optical film may be configured for suspension between the two opposing support edges when the two opposing edge trusses, or regions adjacent to the two opposing edge trusses are attached in proximity to two opposing edges of a light fixture aperture.

In an example embodiment, the at least one piece of optical film may further comprise one or more folds in the lens plane region, wherein the one or more folds may be substantially parallel to the two opposing support edges.

In an example embodiment, each edge truss may further comprise two or more magnets configured for attaching each edge truss in proximity to two opposing edges of a light fixture aperture.

In an example embodiment, each of the two edge trusses may further comprise one or more of clips and fasteners configured for attaching each edge truss in proximity to two opposing edges of a light fixture aperture.

In an example embodiment, the at least one piece of optical film may further comprise refraction features.

In an example embodiment, the lens apparatus may further comprise a light fixture enclosure comprising an aperture, wherein the at least one piece of optical film may be configured for attaching in proximity to two opposing edges of the light fixture aperture.

In an example embodiment, each of the two edge trusses may further comprise three or more sides configured into a hollow elongated structure.

In an example embodiment, the lens apparatus may further comprise an elongated strip of material inserted inside the hollow elongated structure.

In an example embodiment of the disclosed technology, a lens apparatus may comprise two pieces of optical film wherein each piece of optical film may comprise two opposing support edges, wherein an area between the two opposing support edges of each piece of optical film may define a lens plane. Each opposing support edge may comprise an edge truss configured along all, or a substantial portion of a corresponding support edge of each opposing support edge, wherein each edge truss may comprise one or more edge truss sides configured from folds in the at least one piece of optical film. The lens apparatus may also comprise two opposing unsupported edges that may be configured to be suspended between the two opposing support edges.

In an example embodiment, one support edge of each piece of optical film may attach to a lens attachment feature on opposing sides of an elongated heat sink. The other support edge of each piece of optical film may be configured for attaching in proximity to two opposing corresponding edges of a light fixture aperture. The elongated heat sink may be configured for attachment to one or more linear LED arrays, wherein the elongated heat sink may be configured for attachment in proximity to the light fixture aperture.

In an example embodiment, the lens apparatus may further comprise a light fixture enclosure comprising an aperture and an inside, wherein a support edge of each of the two pieces of optical film may be configured for attachment in proximity to two opposing edges of the light fixture aperture. The elongated heat sink may be configured for attachment in proximity to a central portion of the light fixture aperture, wherein light emitting sides of the one or more linear LED arrays may be facing the inside of the light fixture enclosure.

In an example embodiment, both the support edges that are configured for attachment in proximity to the two opposing edges of the light fixture aperture may further comprise three or more sides configured into a hollow elongated structure.

In an example embodiment, both the support edges that are configured for attachment in proximity to the two opposing edges of the light fixture aperture may further comprise two or more magnets configured for attaching the corresponding edge truss in proximity to the two opposing edges of the light fixture aperture.

In an example embodiment of the disclosed technology, a lens apparatus may comprise at least two elongated frame members capable of attaching in proximity to two opposing edges of a light fixture, wherein the two opposing edges of the light fixture may define a light fixture aperture. The lens apparatus may further comprise at least one piece of optical film that may comprise two opposing support edges, wherein an area between the two opposing support edges may define a lens plane, wherein each support edge may be configured for attachment to one of the two elongated frame members. The lens apparatus may also comprise two opposing unsupported edges configured to be suspended between the two support edges, wherein each opposing support edge of the at least one piece of optical film may be attached to corresponding elongated frame members. The at least one piece of optical film may be configured for suspension between the two elongated frame members when the two elongated frame members are attached in proximity to two opposing edges of the light fixture.

In an example embodiment, the at least one piece of optical film may further comprise one or more edge trusses along each of the two opposing support edges.

In an example embodiment, the lens apparatus may further comprise a light fixture enclosure comprising an aperture, wherein the lens apparatus may be configured for attaching to the light fixture, and wherein the lens apparatus may be further configured for covering a portion of the aperture.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. An optical film lens assembly for a light fixture, the optical film lens assembly comprising:
   a lens apparatus configured for transmissively modifying light from a light fixture, the lens apparatus comprising:
      a piece of optical film configured to transmissively modify light from a light source, the piece of optical film comprising:

a substrate composition that allows the piece of optical film to be folded without breaking;

two opposing support edges, wherein an area between the two opposing support edges defines a lens plane, and wherein each opposing support edge comprises a hollow elongated multi-sided tube structure formed from two or more edge trusses, wherein the two or more edge trusses are configured from folds in the piece of optical film;

two opposing non-supported edges of the piece of optical film that are configured without any structural support;

wherein only the two opposing support edges of the piece of optical film are configured to attach to two corresponding opposing edges of an aperture of the light fixture such that:

the lens plane of the optical film piece is freely and flexibly suspended across the aperture of the light fixture; and the two non-supported edges of the piece of optical film are not attached to and not supported by the light fixture.

2. The optical film lens system of claim 1, wherein the piece of optical film further comprises one or more folds in the lens plane region, wherein the one or more folds are substantially parallel to the two opposing support edges.

3. The optical film lens system of claim 1, wherein each opposing support edge of the piece of optical film further comprises two or more magnets configured for attaching in proximity to two opposing corresponding edges of a light fixture aperture.

4. The optical film lens system of claim 1, wherein each opposing support edge of the piece of optical film further comprises one or more of clips and fasteners configured for attaching each opposing support edge in proximity to two corresponding opposing edges of a light fixture aperture.

5. The optical film lens system of claim 1, wherein the at least one piece of optical film further comprises refraction features.

6. The optical film lens system of claim 1, further comprising a light fixture enclosure comprising an aperture, wherein the lens apparatus is configured for attaching in proximity to two opposing edges of the light fixture aperture such that the lens plane of the piece of optical film is freely and flexibly suspended across the light fixture aperture.

7. The optical film lens system of claim 1, further comprising an elongated strip of material inserted inside the hollow tube structure of each opposing support edge of the optical film piece.

8. The optical film lens system of claim 1, wherein the lens apparatus is further configured with an elongated heat sink attached to a central portion of the piece of optical film, wherein the elongated heat sink is parallel to the opposing support edges of the piece of optical film.

9. The optical film lens system of claim 8, further comprising a light fixture enclosure comprising an aperture and an inside portion, wherein the opposing support edges of the piece of optical film are configured for attachment in proximity to two opposing edges of the light fixture aperture, and wherein the elongated heat sink is configured for attachment in proximity to a central portion of the light fixture aperture.

10. The optical film lens system of claim 8, wherein both the opposing support edges that are configured for attachment in proximity to the two corresponding opposing edges of the light fixture aperture further comprise two or more magnets configured for attaching the corresponding support edges in proximity to the two opposing edges of the light fixture aperture.

11. The optical film lens system of claim 9, wherein the elongated heat sink further comprises one or more LED arrays attached to the heat sink, wherein the light emitting sides of the one or more linear LED arrays are facing the inside portion of the light fixture enclosure.

12. An optical film lens system for a light fixture, the optical film lens system comprising:

a lens apparatus configured for transmissively modifying light from a light fixture, the lens apparatus comprising:

two elongated frame members;

a piece of optical film configured to transmissively modify light from a light source, the piece of optical film comprising:

a substrate composition that allows the piece of optical film to be folded without breaking;

two opposing support edges, wherein an area between the two opposing support edges defines a lens plane, and wherein each opposing support edge is configured to attach to one of the two elongated frame members;

two opposing non-supported edges of the piece of optical film that are configured without any structural support;

wherein the two elongated frame members are configured to attach to two corresponding opposing edges of an aperture of the light fixture such that:

the lens plane of the optical film piece is freely and flexibly suspended across the aperture of the light fixture; and the two non-supported edges of the piece of optical film are not attached to and not supported by the light fixture.

13. The optical film lens system of claim 12, wherein the piece of optical film further comprises one or more edge trusses along each of the two opposing support edges.

14. The optical film lens system of claim 12, further comprising a light fixture enclosure comprising an aperture, wherein the lens apparatus is configured for attaching to the light fixture, and wherein the lens apparatus is further configured for covering all or a portion of the aperture.

15. A lens apparatus: configured to transmissively modify light from a light emitting device, the lens apparatus comprising:

at least one piece of optical film configured for transmissively modifying light and configured to attach to a light emitting device in proximity to an aperture of the light emitting device, the at least one piece of optical film comprising:

a substrate that allows the at least one optical film piece to be folded without breaking, the substrate having a first major surface, wherein the first major surface comprises a lens plane;

two or more major edges;

four corner regions;

one or more of a score line, perforated line and crimp line adjacent to at least a portion of at least the two or more major edges; and edge trusses configured along all or a substantial portion of the at least two major edges of the at least one piece of optical film, wherein each edge truss comprises one or more edge truss sides configured from folds in the at least one piece of optical film along the one or more of score lines, perforated lines and crimp lines, wherein at least one edge truss side of each edge truss is configured at an angle relative to the first surface of the at least one piece of optical film; and wherein each edge truss is configured to impart support to the lens apparatus and to resist deflection of the lens apparatus to enable the lens apparatus to be disposed in a substantially flat configuration without requiring tensioners or tensioning from an external frame when suspended along all, or a portion of the periphery of the first surface of the optical film piece, or suspended from four or more points on two or more edge trusses.

16. The lens apparatus of claim 15, wherein at least one edge truss side of each of the at least two edge trusses is configured at an angle of between +20 degrees and 90 degrees, or between −20 degrees and 90 degrees relative to the first surface of the at least one optical film piece.

17. The lens apparatus of claim 15, wherein the at least one piece of optical film further comprises at least two of one or more of a score line, perforated line and crimp line adjacent to at least a portion of the at least two major edges of the at least one piece of optical film, wherein the edge trusses on the at least two major edges of the piece of optical film are configured from folds along the two one or more of score lines, perforated lines and crimp lines.

18. The lens apparatus of claim 15, wherein the at least one piece of optical film further comprises at least three of one or more of a score line, perforated line and crimp line adjacent to at least a portion of the at least two major edges of the at least one piece of optical film, wherein the edge trusses on the at least two major edges of the piece of optical film are configured from folds along the three one or more of score lines, perforated lines and crimp lines.

19. The lens apparatus of claim 15 further comprises corner cuts defined by one or more cuts through the piece of optical film that extend across a corner region, wherein the section of the optical film piece abutting the one or more cuts in the optical film is removed.

20. The lens apparatus of claim 15 further comprises a light fixture enclosure comprising an aperture, wherein the at least one piece of optical film is capable of mounting on the light fixture and covering a portion of the aperture.

21. A lens apparatus: configured to transmissively modify light from a light emitting device, the lens apparatus comprising:

at least one piece of optical film configured for transmissively modifying light and configured to attach to a light emitting device in proximity to the aperture of the light emitting device, the at least one piece of optical film comprising:

a substrate that allows the at least one optical film piece to be folded without breaking, the substrate having a first major surface and a second major surface that opposes the first major surface, wherein the first major surface comprises a lens plane;

two or more major edges;

four corner regions, each having one or more associated minor edges defining one or more corner cuts that define a corner cutout;

an edge truss configured on the two or more major edges, wherein each edge truss is disposed towards the second major surface of the at least one piece of optical film; and each edge truss comprises one or more sides configured from a corresponding fold in the at least one piece of optical film, wherein at least one of the one or more sides of each edge truss is configured at an angle relative to the first major surface of the at least one piece of optical film to impart support to the lens apparatus and to resist deflection of each edge truss.

22. The lens apparatus of claim 21, wherein the first major surface of the at least one piece of optical film is disposed in a substantially planar configuration when suspended from four or more points along the edge trusses, or when suspended along all or a portion of a periphery of the first major surface of the at least one piece of optical film.

23. The lens apparatus of claim 21, wherein at least one edge truss side of each of the two or more edge trusses is configured at an angle of between +20 degrees and 90 degrees, or between −20 degrees and 90 degrees relative to the first major surface of the at least one piece of optical film.

24. The lens apparatus of claim 21, wherein the at least one piece of optical film further comprises one or more of: score lines, crimp lines or perforated lines, wherein at least a portion of the folds are created along the one or more of score lines, crimp lines or perforated lines.

25. The lens apparatus of claim 21 is configured to nest inside a light fixture doorframe that attaches to a light fixture.

26. The lens apparatus of claim 21 further comprises a light fixture enclosure comprising an aperture, wherein the at least one piece of optical film is capable of mounting on the light fixture and covering a portion of the aperture.

* * * * *